(12) United States Patent
Menon et al.

(10) Patent No.: US 11,184,301 B2
(45) Date of Patent: Nov. 23, 2021

(54) MESSAGE RECOMMENDATION SYSTEM

(71) Applicant: Microsoft Technology Licensing, LLC, Redmond, WA (US)

(72) Inventors: Lekshmi Menon, Redmond, WA (US); Amar Budhiraja, Bangalore (IN); Gaurush Hiranandani, Redmond, WA (US); Prateek Jain, Bangalore (IN); Darshatkumar Anandji Shah, Bangalore (IN); Ayush Choure, Bangalore (IN); Navya Yarrabelly, Bangalore (IN); Anurag Mishra, Redmond, WA (US); Mohammad Luqman, Redmond, WA (US); Shivangi Dhakad, Redmond, WA (US); Juhi Dua, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 90 days.

(21) Appl. No.: 16/541,818

(22) Filed: Aug. 15, 2019

(65) Prior Publication Data
US 2021/0051121 A1 Feb. 18, 2021

(51) Int. Cl.
*G06F 15/16* (2006.01)
*H04L 12/58* (2006.01)
(Continued)

(52) U.S. Cl.
CPC ........ *H04L 51/046* (2013.01); *G06F 16/9024* (2019.01); *G06N 3/08* (2013.01); *H04L 51/02* (2013.01)

(58) Field of Classification Search
CPC ... H04L 51/046; H04L 51/02; G06F 16/9024; G06N 3/08
(Continued)

(56) References Cited

U.S. PATENT DOCUMENTS

| 7,185,065 | B1 * | 2/2007 | Holtzman | G06Q 40/06 |
| | | | | 709/217 |
| 8,825,759 | B1 * | 9/2014 | Jackson | H04L 67/02 |
| | | | | 709/204 |

(Continued)

OTHER PUBLICATIONS

"International Search Report and Written Opinion Issued in PCT Application No. PCT/US2020/036850", dated Aug. 24, 2020, 16 Pages.

(Continued)

*Primary Examiner* — David R Lazaro
*Assistant Examiner* — Mariegeorges A Henry
(74) *Attorney, Agent, or Firm* — Schwegman Lundberg & Woessner, P.A.

(57) ABSTRACT

Systems and methods for entity recommendation can make use of rich data by allowing the items to be recommended and the recipients of the recommendation (e.g., users) to be modeled as "complex entities" composed of one or more static sub-entities and/or a dynamic component, and by utilizing information about multiple relationships between the sub-entities as reflected in bipartite graphs. Generating recommendations from such information may involve creating vector representations of the sub-entities based on the bipartite graphs (e.g., using graph-based convolutional networks), and combining these vector representations into representations of the items and users (or other recipients) to be fed into a classifier model.

20 Claims, 9 Drawing Sheets

(51) Int. Cl.
*G06F 16/901* (2019.01)
*G06N 3/08* (2006.01)
(58) Field of Classification Search
USPC .................................................. 709/204–206
See application file for complete search history.

(56) References Cited

U.S. PATENT DOCUMENTS

| | | | |
|---|---|---|---|
| 2003/0195937 | A1 | 10/2003 | Kircher, Jr. et al. |
| 2012/0254910 | A1* | 10/2012 | Donoghue ....... H04N 21/26258 725/14 |
| 2013/0246441 | A1 | 9/2013 | Nashed et al. |
| 2013/0290905 | A1* | 10/2013 | LuVogt .................. G06N 3/006 715/835 |
| 2018/0121827 | A1* | 5/2018 | Green .................... G06Q 50/01 |
| 2018/0365229 | A1 | 12/2018 | Buhrmann et al. |
| 2019/0073580 | A1 | 3/2019 | Dzhulgakov et al. |
| 2019/0205964 | A1 | 7/2019 | Onoro Rubio et al. |
| 2020/0382612 | A1* | 12/2020 | Zhao ........................ G06N 3/08 |
| 2021/0049442 | A1 | 2/2021 | Menon et al. |

OTHER PUBLICATIONS

Ahn, et al., "A new similarity measure for collaborative filtering to alleviate the new user cold-starting problem", In Journal of Information Sciences, vol. 178, Issue 1, Jan. 2008, pp. 37-51.
Berg, et al., "Graph Convolutional Matrix Completion", Retrieved from: https://arxiv.org/pdf/1706.02263.pdf, Jun. 7, 2017, 9 Pages.
Dai, et al., "Discriminative embeddings of latent variable models for structured data", In Proceedings of the 33rd International Conference on International Conference on Machine Learning, vol. 48, Jun. 19, 2016, pp. 2702-2711.
Defferrard, et al., "Convolutional neural networks on graphs with fast localized spectral filtering", In Proceedings of the 30th International Conference on Neural Information Processing Systems, Dec. 5, 2016, pp. 3844-3852.
Gomez-Rodriguez, et al., "Quantifying Information Overload in Social Media and its Impact on Social Contagions", In Proceedings of the Eighth International AAAI Conference on Weblogs and Social Media, Mar. 26, 2014, pp. 170-179.
Hammond, et al., "Wavelets on Graphs via Spectral Graph Theory", In Journal of Applied and Computational Harmonic Analysis, vol. 30, No. 2, Dec. 19, 2009, pp. 129-150.
Jain, et al., "Provable Inductive Matrix Completion", Retrieved from: https://arxiv.org/pdf/1306.0626.pdf, Jun. 4, 2013, 22 Pages.
Kar, et al., "Online and Stochastic Gradient Methods for Non-decomposable Loss Functions", In Proceedings of the 27th International Conference on Neural Information Processing Systems—vol. 1, Dec. 8, 2014, pp. 694-702.
Ke, et al., "LightGBM: A Highly Efficient Gradient Boosting Decision Tree", In Proceedings of the 31st International Conference on Neural Information Processing Systems, Dec. 4, 2017, 9 Pages.
Kim, et al., "Collaborative User Modeling For Enhanced Content Filtering in Recommender Systems", In Journal of Decision Support Systems, vol. 51, Issue 4, Nov. 2011, pp. 772-781.
Kingma, et al., "Adam: A Method for Stochastic Optimization", Retrieved from: https://arxiv.org/pdf/1412.6980.pdf, Jan. 30, 2017, 15 Pages.
Kipf, et al., "Semi-Supervised Classification with Graph Convolutional Networks", Retrieved from: https://arxiv.org/pdf/1609.02907.pdf Sep. 9, 2016, 14 Pages.
Koren, et al., "Matrix Factorization Techniques for Recommender Systems", In Journal of Computer, vol. 42, Aug. 2009, pp. 42-47.
Le, et al., "Direct Optimization of Ranking Measures", Retrieved From: https://arxiv.org/pdf/0704.3359.pdf, Apr. 25, 2007, 25 Pages.
Li, et al., "Deeper Insights into Graph Convolutional Networks for Semi-Supervised Learnin", In Proceedings of the 32nd AAAI Conference on Artificial Intelligence, Jan. 22, 2018, 8 Pages.
Li, et al., "Recommendation as Link Prediction In Bipartite Graphs: A Graph Kernel-Based Machine Learning Approach", In Journal Decision Support Systems, vol. 54 Issue 2, Jan. 2013, pp. 880-890.
Mikolov, et al., "Distributed representations of words and phrases and their compositionality", In Proceedings of the 26th International Conference on Neural Information Processing Systems, vol. 2, Dec. 5, 2013, pp. 1-9.
Monti, et al., "Geometric Deep Learning On Graphs and Manifolds Using Mixture Model CNNs", In Proceedings of the IEEE Conference on Computer Vision and Pattern Recognition, Nov. 25, 2016, 10 Pages.
Pennington, et al., "Glove: Global vectors for word representation", In Proceedings of the 2014 Conference on Empirical Methods in Natural Language Processing, Oct. 25, 2014, pp. 1532-1543.
Rao, et al., "Collaborative Filtering with Graph Information: Consistency and Scalable Methods", In Proceedings of the 28th International Conference on Neural Information Processing Systems—vol. 2, Dec. 7, 2015, 9 Pages.
Simonyan, et al., "Very Deep Convolutional Networks for Large-Scale Image Recognition", Retrieved from: https://arxiv.org/pdf/1409.1556.pdf%20http://arxiv.org/abs/1409.1556.pdf, Sep. 4, 2014, 14 Pages.
Tang, et al., "ArnetMiner: Extraction and Mining of Academic Social Networks", In Proceedings of the 14th ACM SIGKDD international conference on Knowledge discovery and data mining, Aug. 24, 2008, 9 Pages.
Wang, et al., "A Theoretical Analysis of NDCG Ranking Measures", In Proceedings of the 26th annual conference on Tearning theory (COLT 2013), vol. 8, May 6, 2013, 26 Pages.
Wang, et al., "Flickr Group Recommendation with Auxiliary Information In Heterogeneous Information Networks", In Journal of Multimedia Systems, vol. 23, Issue 6, Nov. 2017, pp. 703-712.
"International Search Report and Written Opinion Issued in PCT Application No. PCT/US2020/036853", dated Aug. 24, 2020, 14 Pages.

\* cited by examiner

MESSAGE RECOMMENDATION SYSTEM

TECHNICAL FIELD

The disclosed subject matter relates generally to systems and methods for automatically generating recommendations, and more specifically to graph-based neural network architectures for recommendation generation.

BACKGROUND

The modern data-rich world is characterized not only by routine reliance on digital information sources, but also by a paradigm shift from a "pull model" of information retrieval, in which users explicitly search for information, to a "push model," in which relevant information is automatically recommended to them. Not surprisingly, therefore, large-scale online service providers, such as e-commerce websites and social networks, tend to integrate some form of "entity recommendation" into their service offerings as a core part of the user experience. Within a large system, serving relevant information in the right context—for example, recommending relevant products to a user out of hundreds of millions of products on an e-commerce website, or surfacing the right post that the user may want to consume in the current context out of millions of posts on a social media platform—constitutes a challenging computational problem.

The machine-learning community has devoted significant research to the entity-recommendation problem and developed multiple approaches to its solution. However, typical formulations described in the literature take a rather simplistic view of the whole system by modeling only two entities, such as the user and the item to be recommended. While such simple abstractions provide tractable formulations that can be addressed using rigorous algorithms, they ignore subtleties and complexities of key information available in the system. To capture the key information in the system, several practical recommendation systems use content filtering approaches, where joint features for (user, item) tuples are hand-designed and then fed into a classifier. Designing features is, however, a difficult problem, especially for real-world systems with several sources of information. Consequently, such methods often suffer from issues such as, e.g., poor accuracy or a difficult maintenance cycle. A need, therefore, exists for an approach to entity recommendation that automatically captures information subtleties and complexities.

SUMMARY

Described herein are aspects of data processing systems, methods, and computer program products (as embodied in machine-readable media) for entity recommendation that can capture subtleties and complexities not accounted for in simplistic two-entity models by allowing the items to be recommended and the recipients of the recommendation (e.g., users) to be modeled as "complex entities" composed of one or more static sub-entities and/or a dynamic component, and by utilizing information about multiple relationships between the sub-entities. The recipients of the recommendation are hereinafter also referred to as "first items," and the items to be recommended are hereinafter also referred to as "second items." To provide some non-limiting examples, first and second items, respectively, may be, e.g., users and messages recommended for their consumption, or research publications and proposed citations to other publications.

The static sub-entities, hereinafter also simply referred to as "entities," are unique, fixed instances of, generally, multiple entity types. The first and second items are instances of respective first and second complex entity types. Each complex entity type is, in accordance herewith, defined by a corresponding set of associated (sub-)entity types (selected among the multiple entity types), sometimes in conjunction with a dynamic component that renders each complex-entity instance each item) unique. For example, a publication item may be represented by its author (a static entity that may be shared among multiple publications), the journal in which it was published (another static entity that may be shared among multiple publications), and its text, or a unique portion of its text (e.g., title or abstract), constituting the dynamic component. As a special case corresponding to a "degenerate" complex entity type, a set of items may consist simply of entities of a single type. For example, user entities may be used as such to represent first or second items.

Relationships between entities (or, synonymously, "entity instances") can be represented by graphs. In accordance with various embodiments, relationships between a pair of any two entity types are reflected in a bipartite graph. While the discussion is centered on bipartite graphs representing two different types of entities, the concepts can straightforwardly be extended to graphs between entities between entities of the same type. (One non-limiting way of doing so, within a framework of bipartite graphs, would be to represent the relationships among entities of a single entity type as a bipartite graph between two copies of the entities of that single type.) Graphs (e.g., bipartite graphs) are used herein to inform the computation of recommendations of the second items to the first items; in a way, the first and second items "inherit" the relationships between their associated entities.

Given definitions of the first and second items and mathematical representations of their sub-entities and dynamic components (if any), and based on bipartite graphs representing relationships between the sub-entities, the approach described herein automatically scores pairs of a first item and a second item according to the relevance of the second item to the first, enabling recommendations to be made based on the scores, without the need for hand-designing features that capture the rich information reflected in the complex-entity definitions and graphs. In various embodiments, the scoring utilizes a multi-layer architecture. In the first layer, computational models for the bipartite graphs, e.g., graph-based convolutional neural networks (CNNs), are used to compute vector representations of the entity instances associated with the first and second items. In general, each item has multiple such associated vector representations (herein also "entity vector representations," to distinguish them from the overall representations of the items), which may correspond to different sub-entities and their respective associated bipartite graphs, or to multiple different bipartite graphs involving the same sub-entity. In one or more subsequent layers, these multiple entity vector representations, along with any dynamic component, are combined into item vector representations (e.g., using a neural network to merge entity vector representations associated with different bipartite graphs between the same two entity types, and/or concatenating entity vector representations and dynamic-content representations). The resulting item vector representations for pairs of a first and a second item are, in the last layer, fed into a classifier (e.g., a multi-layer perceptron (MLP)) to generate relevance scores. Recommendations can then be generated by filtering, ranking, etc. based on the relevance scores.

The multi-layer architecture can be trained, in some embodiments end-to-end, with a suitable learning algorithm to optimize a specified performance metric based on labeled training data. Described herein is a metric—applicable, in particular, to imbalanced data—that does not only reward the occurrence of relevant items in the top-scoring items, but also penalizes the occurrence of irrelevant items in the top-scoring items. This metric can be optimized indirectly in an iterative process that involves, in each iteration, training the architecture to optimize a surrogate metric, and then using the trained architecture to score the training data; and selecting; based on the scores, a subset of the training data as the training dataset for the next iteration.

In one aspect, the recommendation approach described herein is applied to message recommendation within a conversation platform where messages are posted to channels and users have access to all channels with which they are associated. To avoid information overload to users in the face of large numbers of messages they can access; automatic message recommendation is used to surface only a small number of particularly relevant messages to a given user. These message recommendations may be computed in real-time as messages come in by first weaning the potentially large number of recipients based on recipient shortlists associated with the message author, then scoring users on the shortlist using a multi-layer architecture operating on complex entities and bipartite graphs as described above, and optionally further refining the subset of users identified based on the scoring using explicit user feedback.

The foregoing summary introduces key concepts and selected aspects and features of the inventive subject matter, but is not intended as an exhaustive exposition of all embodiments of the subject matter herein sought to be patented.

BRIEF DESCRIPTION OF THE DRAWINGS

The foregoing will be more readily understood from the following detailed description of various embodiments, in particular; when taken in conjunction with the accompanying drawings.

DETAILED DESCRIPTION

The present disclosure describes an approach to automated recommendation generation that is applicable to a wide variety of recommendation problems, entity types, and relationships between the entities. Entities may include, for instance, users (acting, e.g., as authors of publications, posts, or other content; senders or recipients of messages; buyers or sellers of products; etc.), documents (e.g., publications, posts, messages, media content, etc.), venues (e.g., journals, conferences, cities, communication channels, etc.), affiliations (e.g., institutions, social-network groups, etc.), products/services, and many others. Relationships between these entities may include, for example, connections or similarity between entities of the same type (e.g., social connections between users, citations between documents, similarity, between products) and transaction or associations between entities of different types (e.g., purchase transactions of users for products, associations of documents with publication venues or authors, user affiliations with institutions, etc.). A recommendation problem can be characterized by the nature of the recipients of the recommendation (i.e., the first items) and the kinds of items to be recommended (i.e., the second items), both of which are herein defined in terms of (static) entities and (usually, but not necessarily) a dynamic component. In the following, a system and neural-network architecture for generating recommendations of second items to first items from mathematical representations of the entities and dynamic components making up the items and of relationships between the entities are described with respect to the accompanying drawings.

Figure 1:
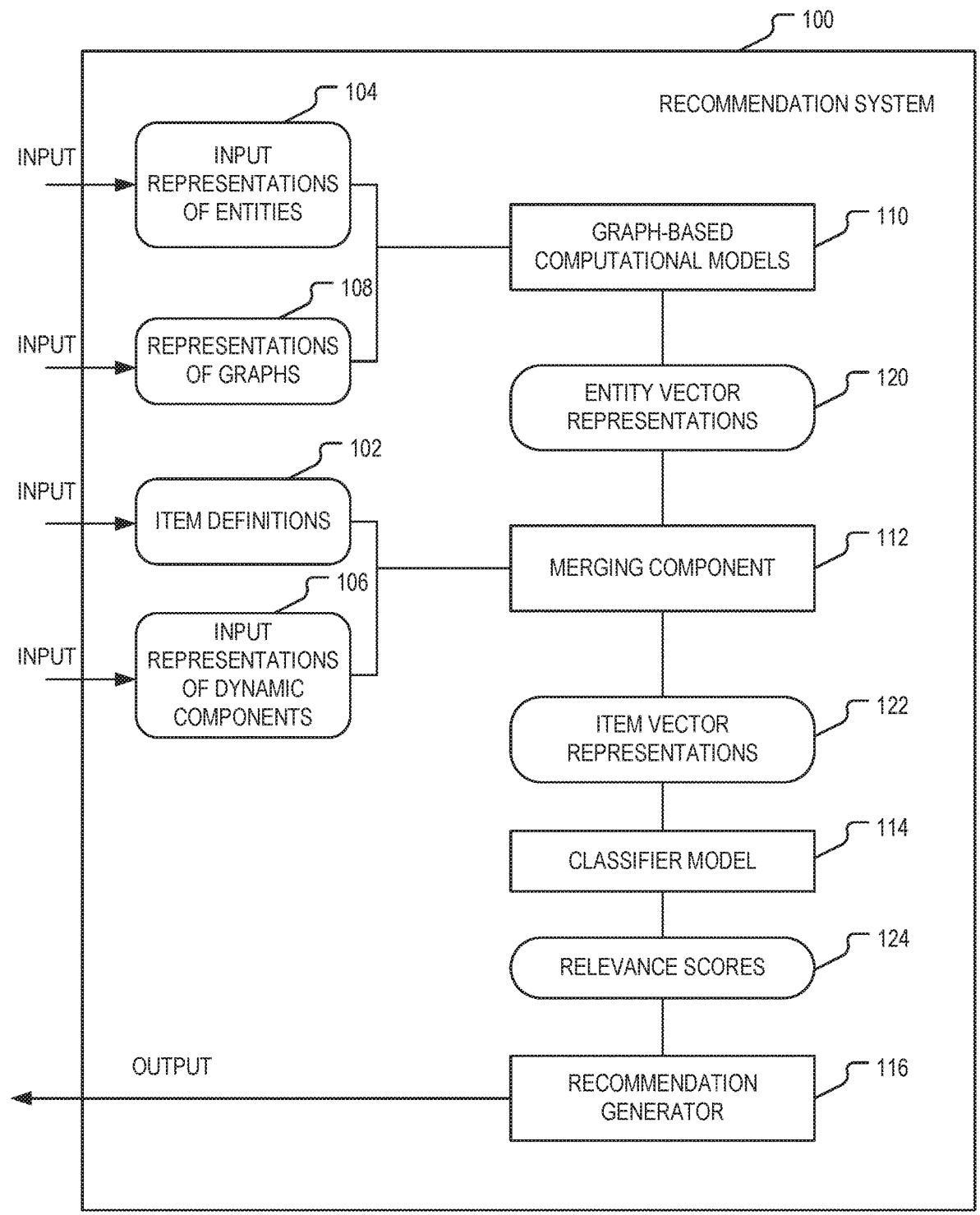
FIG. 1 is a schematic block diagram of a recommendation system in accordance with various embodiments.
Figure 9:
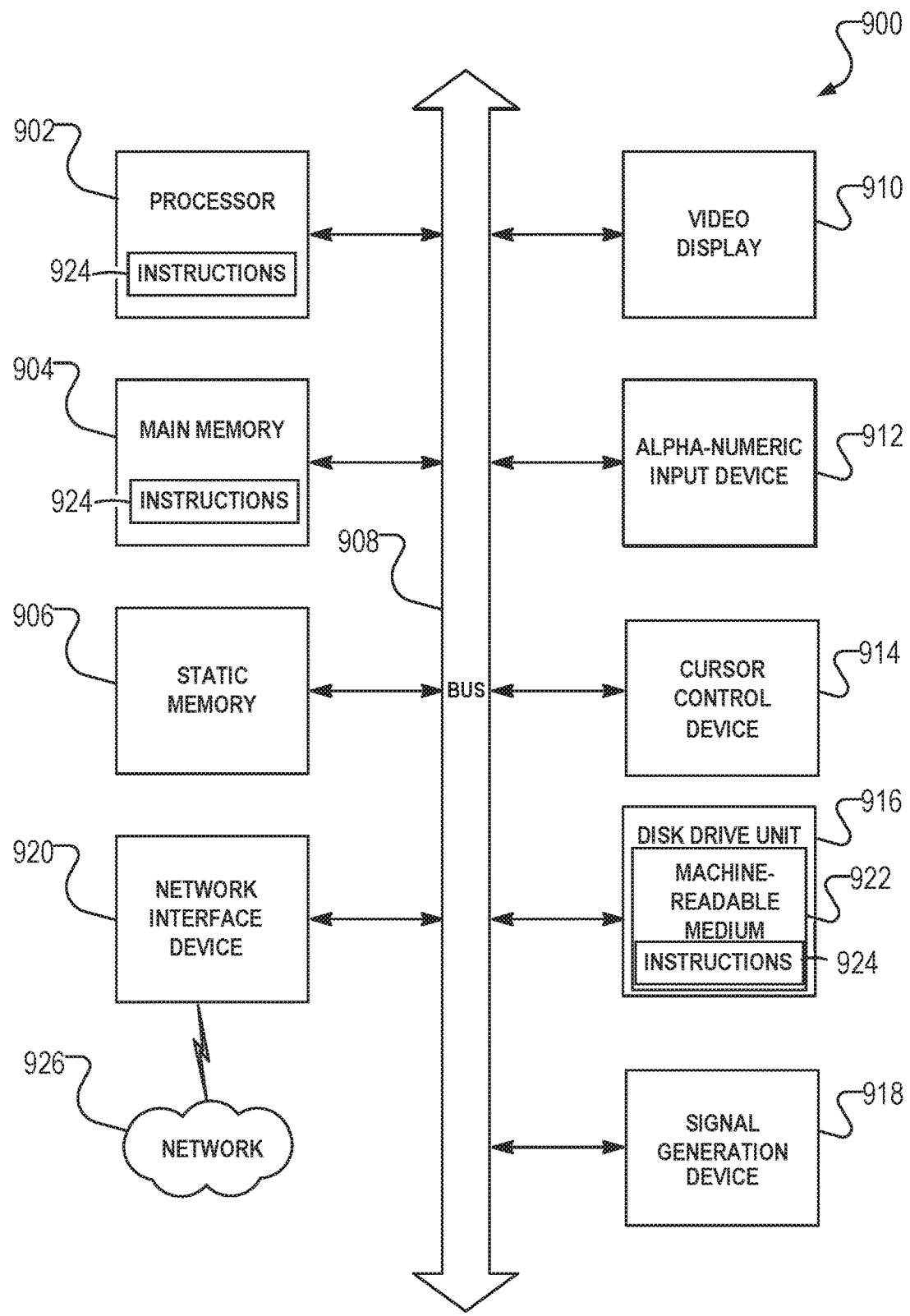
FIG. 9 is a block diagram of an example computing system as may be used to implement the systems of FIGS. 1, 5, and 7, in accordance with various embodiments.

FIG. 1 is a schematic block diagram of a data processing system for generating recommendations (hereinafter also referred to as a "recommendation system" 100), in accordance with various embodiments. The recommendation system 100 can be implemented with a suitable combination of hardware and/or software, and generally includes one or more suitably configured or programmed hardware processors (such as central processing units (CPUs), graphic processing units (GPUs), digital signal processors (DSPs), field-programmable gate arrays (FPGAs), application-specific integrated circuits (ASICs), etc.). In various embodiments, the recommendation system 100 is implemented by a general-purpose computer (e.g., as illustrated in FIG. 9) executing software, or a cluster of multiple such computers intercommunicating via a network. In brief, the computer or cluster includes one or more CPUs and/or GPUs, as well as (volatile and/or non-volatile) computer memory storing data and program code for execution by the CPU(s) and/or GPU(s). The computer may also include input/output devices (e.g., a keyboard/mouse and screen display for user interactions) and/or a network interface (e.g., for connecting to the internet).

The recommendation system 100 stores, in memory, item definitions 102 for the recommendation recipients and the items to be recommended (i.e., first and second items) in terms of sets of entity types and dynamic components, and mathematical input representations of the entities 104 and dynamic components 106 as well as of graphs 108 reflecting relationships between the entities 104. In various embodiments, the input representations of the entities 104 and dynamic components 106 take the form of vectors, such as feature vectors derived from attributes of the entities, onehot encodings (binary vectors reflecting, e.g., the numerical value of an entity ID within a dataset), bag-of-words vectors of text input, etc.; these and other suitable entity vector representations are well-known to those of ordinary skill in the art. The graphs are, in various embodiments, represented as adjacency matrices, i.e., matrices whose dimensions correspond to the number of instances of the respective entity types (the nodes of the graph) and whose cells reflect whether an entity of one type is connected with an entity of the other type and, optionally, how strong that connection is. The mathematical input representations of the entities 104, dynamic components 106, and graphs 108 may be provided directly as input to the system 100, or may be computed by the system 100 from other input representations (e.g., from text constituting dynamic components, unique entity names, or datasets defining the entities in the form of text, images, etc.).

The recommendation system 100 further includes a number of functional blocks 110, 112, 114, 116 that implement computational models and algorithms for processing the item definitions 102 and the mathematical input representations of the entities 104, dynamic components 106, and graphs 108 to generate recommendations. Specifically, graph-based computational models 110 created from the representations of the various graphs 108 (e.g., graph-based convolutional neural networks) operate, independently for each graph, on the input vector representations of the entities 104 (constituting the nodes) of the graph to compute respective entity vector representations 120 that capture the relationships reflected in the graph. Since the relationships between the entities are not affected by the item definitions, the entity vector representations 120 may be precomputed as well as shared between multiple recommendation problems to which they are relevant. Based on the item definitions 102 for a given recommendation problem, merging component 112 combines all entity vector representations 120 associated with each item, along with the input representation of any dynamic component 106 of the item, into an item vector representation 122. Classifier model 114 can then score any pair of a first item and a second item, taking the associated item vector representations 122 as input. The resulting scores 124, which quantify how relevant the second item is to the first item, may be used by recommendation generator 116 to generate recommendations, e.g., by identifying pairs of a first item and a second item, among a set of pairs, that have a relevance score 124 above a certain threshold, or by ranking the pairs based on their relevance scores 124 and returning a specified number of top-ranking pairs. The recommendations may be provided as output, e.g., to a user via a suitable user interface, or to a downstream computational process.

In some embodiments, the computation of item vector representations by the merging component 112 and scoring of pairs is triggered by the recommendation generator 116 and confined to items of interest at the time. For example, recommendations may be generated on demand for a given user (constituting a specific "first item") by scoring pairs of the item vector representation for that user and the item representations of all potentially relevant second items. Conversely, receipt of a new item to be recommended in a system (e.g., a new message) may trigger the computation of a corresponding item vector representation and scoring of the relevance of the item to all potential recommendation recipients.

For a more formal mathematical description of an algorithm for scoring pairs of first and second items in accordance with various embodiments, consider the following problem formulation: Let the first item (the recommendation recipient) be denoted by $\mathcal{U}$ (for "user," though the first item may also be a document or other type of item), and let the second item (the item to be recommended) be denoted by $\mathcal{I}$ (for "item"); the goal is to determine a score for the relevance of $\mathcal{I}$ to $\mathcal{U}$. In general, both $\mathcal{U}$ and $\mathcal{I}$ are complex entities with one or more static sub-entities and (optionally) a dynamic component. Further, let $\varepsilon^{(1)}, \ldots, \varepsilon^{(E)}$ be given entity types, and let $\varepsilon^{(i)}(j)$ denote the j-th entity of type i. For example, if $\varepsilon^{(1)}$ denotes a set of authors, then $\varepsilon^{(1)}(j)$ denotes the j-th author in the set. With these notations, $\mathcal{U}$ can be defined as:

$$\mathcal{U} = \left( \varepsilon_{\mathcal{U}}^{(a_1)}, \ldots, \varepsilon_{\mathcal{U}}^{(a_{k_1})}, \zeta(\mathcal{U}) \right),$$

where each user $\mathcal{U}$ has $k_1$ entity types $\varepsilon^{(a_i)}(i \in [k_1])$, $\varepsilon_{\mathcal{U}}^{(a_i)}$ denotes the entity instance of type $\varepsilon^{(a_i)}$ associated with $\mathcal{U}$, and $\xi(\mathcal{U})$ is the dynamic component of $\mathcal{U}$. For example, a research paper $\mathcal{U}$ written for a conference C by author A may be defined in terms of a conference entity $\varepsilon_{\mathcal{U}}^{conf} = C$ and an author entity $\varepsilon_{\mathcal{U}}^{auth} = A$, along with the dynamic component $\xi(\mathcal{U}) \in \mathbb{R}^{D_{\mathcal{U}}}$, which may be, e.g., a $D_{\mathcal{U}}$-dimensional word-to-vector embedding of the paper abstract and title. Similarly, the item $\mathcal{I}$ can be defined as:

$$\mathcal{I} = \left( \varepsilon_{\mathcal{I}}^{(b_1)}, \ldots, \varepsilon_{\mathcal{I}}^{(b_{k_2})}, v(\mathcal{I}) \right),$$

where each item $\mathcal{I}$ has $k_2$ entity types $\varepsilon^{(b_i)}(i \in [k_2])$, $\varepsilon_{\mathcal{I}}^{(b_i)}$ denotes the entity instance of type $\varepsilon^{(b_i)}$ associated with $\mathcal{I}$, and $v(\mathcal{I}) \in \mathbb{R}^{D_{\mathcal{I}}}$ denotes the $D_{\mathcal{I}}$-dimensional dynamic component of the item. The entity types defining the item $\mathcal{I}$ may be different from or the same as those defining the user $\mathcal{U}$, depending on the type of problem. For instance, citation items, like the papers to which they are recommended, may be defined in terms of authors, conference venues, and word-to-vector embeddings of the title and abstract of the paper to be cited.

Relationships between the static entities can be represented by bipartite graphs (generally multiple graphs for multiple relationships) whose nodes correspond to entities and whose edges correspond to the relationships between any two entities. For example, the edges of an author-conference graph may represent the number of times an author has published at a certain conference in the past. Let the bipartite graph between entities of types $\varepsilon^{(a)}$ (which are $|\varepsilon^a|$ in number) and $\varepsilon^{(b)}$ (which are $|\varepsilon^b|$ in in number) be denoted by:

$$G^{a,b} = (V^{a,b}, A^{a,b}),$$

where $V^{a,b}$ is the set of $(|\varepsilon^a| + |\varepsilon^b|)$ nodes and $A^{a,b} \in \mathbb{R}^{|\varepsilon^a| \times |\varepsilon^b|}$ is the adjacency matrix of the graph, the rows and columns of $A^{a,b}$ being associated with entity instances of types $\varepsilon^{(a)}$ and $\varepsilon^{(b)}$, respectively. For any two entity types associated with entity instances of types $\varepsilon^{(a)}$ and $\varepsilon^{(b)}$, there may be multiple graphs representing different relationships. Thus, let $\mathcal{G}^{a,b} = \{G^{a,b,1}, \ldots, G^{a,b,|\mathcal{G}^{a,b}|}\}$ be the set of graphs between entities $\varepsilon^{(a)}$ and $\varepsilon^{(b)}$. Further, let the set of all existing graphs for any pair of entities within a set $\{\varepsilon^{(1)}, \ldots, \varepsilon^{(E)}\}$ be denoted by $\mathcal{G} = \{G^1, \ldots, G^{|\mathcal{G}|}\}$.

Figure 2:
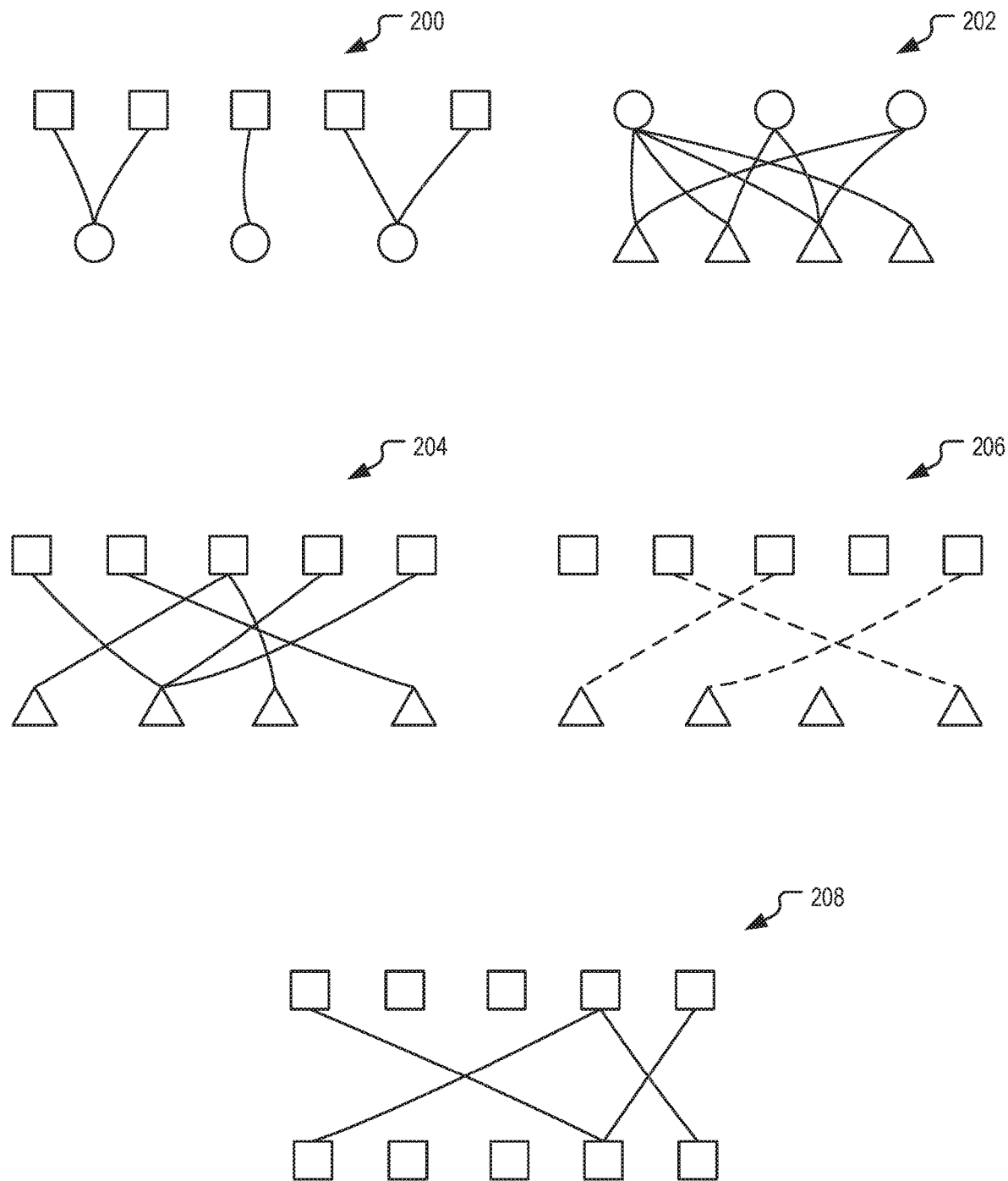
FIG. 2 is a diagram conceptually illustrating an example collection of entities and relationships therebetween, in accordance with various embodiments.

FIG. 2 is a diagram conceptually illustrating an example collection of entities and relationships therebetween, in accordance with various embodiments. Three types of entities, $\varepsilon^{(a)}$, $\varepsilon^{(b)}$, and $\varepsilon^{(c)}$ are depicted as squares, circles, and triangles, respectively. The number of entity instances may differ between entity types, as shown. Relationships between pairs of entities are reflected in a number of (five, in this example) bipartite graphs 200, 202, 204, 206, 208. Bipartite graphs 200, 202, 204, 206 capture relationships between two different types of entities, with bipartite graphs 204, 206 corresponding to two different relationships between the same pair of entities. Bipartite graph 208 represents the relationships between the entities of a single type, which are duplicated to fit the relationships into the framework of bipartite graphs. To illustrate by way of example, assume that the squares, circles, and triangles represent researchers $\varepsilon^{(a)}$, fields of research $\varepsilon^{(b)}$, and scientific journals $\varepsilon^{(c)}$, respectively. Bipartite graph 200 may reflect the fields of research in which the various researchers work, and bipartite graph 202 may represent which journals include publications in the various fields of research. Bipartite graphs 204, 206 may capture two different relationships between researchers and journals, such as which journals a researcher has published in, or for which journals a researcher has previously served as a reviewer. The bipartite graph 208 may represent relationships between the researchers themselves, such as co-authorship of publications. Such rich information about the relationships between the three entities may be useful, for instance, to generate recommendations of possible journals $\mathcal{J}$ in which to publish a research article $\mathcal{U}$, where the article is represented by the researcher $\varepsilon_u^{(a)}$ that authored it, optionally the field of research $\varepsilon_u^{(b)}$, and a dynamic component based on the text, and where the possible journals $\mathcal{J}$ are represented by the journal entities $\varepsilon_j^{(c)}$ themselves.

Figure 3:
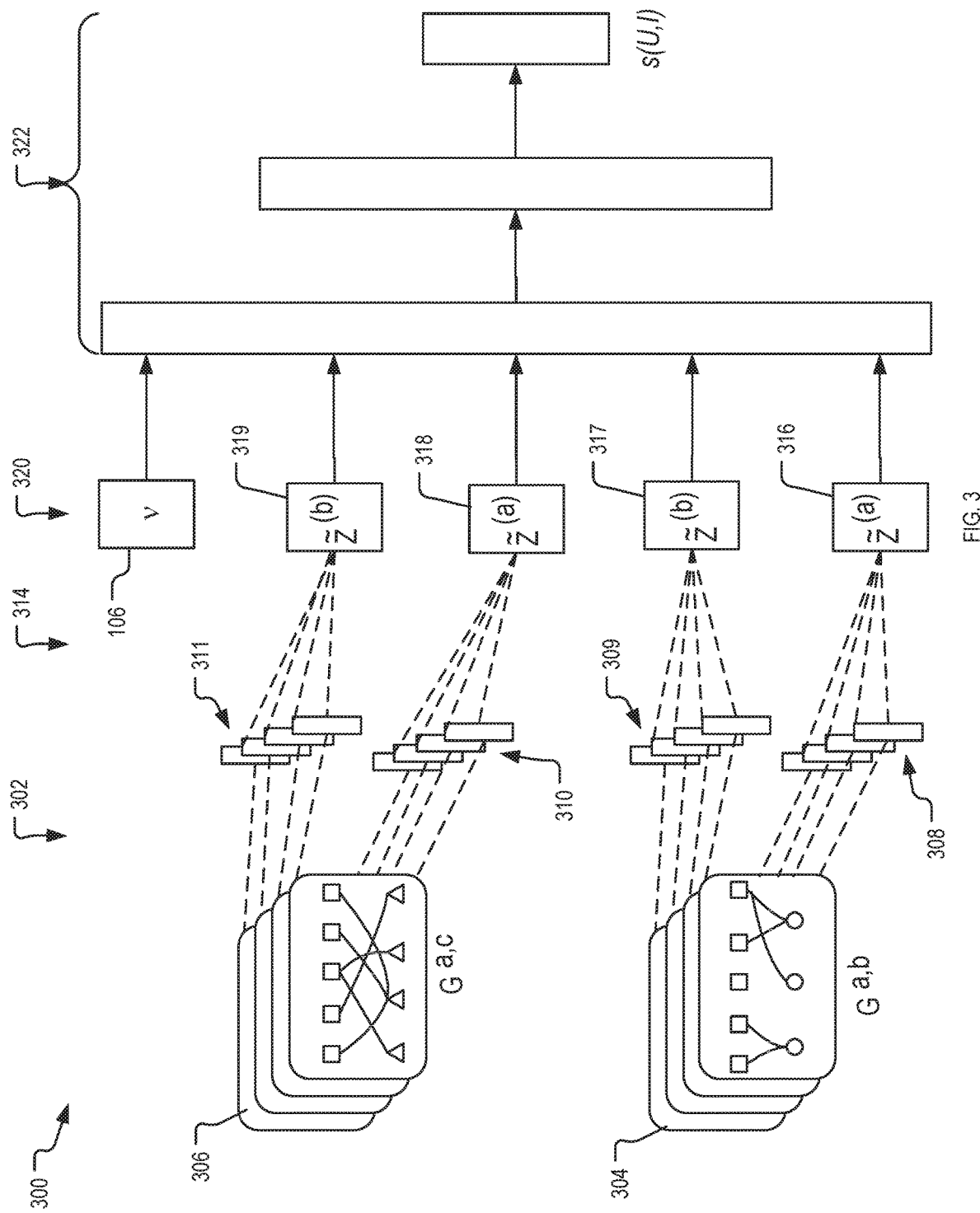
FIG. 3 is a schematic diagram of an example neural-network architecture for computing recommendations in accordance with various embodiments.

Turning now to an example algorithm for computing recommendations in accordance with various embodiments, FIG. 3 is a schematic diagram illustrating a multi-layer neural-network architecture 300 suitable for this purpose. In a first layer 302, computational models 110 of various bipartite graphs 304, 306 are used to compute entity vector representations 308, 309, 310, 311 (corresponding to 120 in FIG. 1), herein also "entity embeddings," for the entity instances that constitute the nodes of the graphs 304, 306. (The term "embedding" is herein understood, consistently with its general use in the context of neural networks, as a learned, continuous vector representation (i.e., a vector of continuous numbers) of a discrete or categorical variable.) In the depicted (non-limiting) example, bipartite graphs 304 represent relationships between entities of types $\varepsilon^{(a)}$ and $\varepsilon^{(b)}$, and bipartite graphs 306 represent relationships between entities of types $\varepsilon^{(a)}$ and $\varepsilon^{(c)}$; of course, the architecture 300 may similarly incorporate further entities and further relationships between entities of different types or of the same type.

In various embodiments, the computational models for the bipartite graphs are, or include, graph-based CNNs as known to those of ordinary skill in the art. For a given graph G=(V, A), a convolution on a graph signal $x \in \mathbb{R}^{|V|}$, with a filter c parameterized by $W \in \mathbb{R}^V$ in the Fourier domain, is defined as follows:

$$c_w * x := U c_w U^T x,$$

where U is the eigenvectors matrix of the normalized Laplacian L of graph G. To reduce computational expense (which is otherwise high due to $\mathcal{O}(|V|^2)$ multiplicative complexity), the filter $c_w(\Lambda)$, which is a function of eigenvalues $\Lambda$ of L, may be approximated in terms of Chebyshev polynomials:

$$c_w(\Lambda) \approx \Sigma_{h=0}^H W_h T_h(\tilde{\Lambda}),$$

where $$\tilde{\Lambda} = \frac{2}{\lambda_{max}} \Lambda - I_{|V|}, \lambda_{max}$$

is the largest eigenvalue of L, $I_{|V|}$ is an identity matrix of size $|V|$, $W_h$ are coefficients to be learned during training of the CNN, and $T_h$ are the h-th order Chebyshev polynomials defined recursively as $T_h(x)=2 \times T_{h-1}(x) T_{h-2}(x)$ with $T_1(x)=x$ and $T_0(x)=1$. Applying this approximation to the convolution operation, the convolution on the graph signal can be computed more simply as:

$$c_w * x = \Sigma_{h=0}^H W_h T_h(\tilde{L}) x,$$

where $$\tilde{L} = \frac{2}{\lambda_{max}} L - I_{|V|}.$$

Since this approximation is a function of the H-th order Laplacian, it performs local operations by considering only the H-th order neighborhood of a node. These local operations are then applied across all locations in the graph.

Returning to the application of CNNs to a bipartite graph $G^{a,b}$ representing relationships between entities of types $\varepsilon^{(a)}$ and $\varepsilon^b$, let the graph, for simplicity of exposition, be represented as $G=\{V^a \cup V^b, A\}$, where $V^a$ and $V^b$ correspond to entity instances of types $\varepsilon^{(a)}$ and $\varepsilon^{(b)}$, respectively, and A is the adjacency matrix between the nodes defined as:

$$A = \begin{pmatrix} 0 & A^{a,b} \\ (A^{a,b})^T & 0 \end{pmatrix}.$$

The normalized Laplacian for the graph is defined as:

$$L = I - D^{-1/2} A D^{-1/2},$$

where D is the diagonal degree matrix of A and is the identity matrix of size $|\varepsilon^a| + |\varepsilon_b|$. Further, $\tilde{L}$ is defined as above.

The order H of the polynomial approximation can, in principle, be determined by cross-validation on training data, although this process is computationally expensive. It has been shown both theoretically and empirically that, for large values of H, all entity embeddings converge to the same vector during the optimization routine, deteriorating the classification results. In various embodiments, therefore, a small value, e.g., H=2 is chosen. Heuristically, the graph convolution operation is a form of message passing with messages/features being transformed across edges of the graph. For bipartite graphs, it is desirable to get the same entity embedding for multiple entity instances of type $\varepsilon^{(a)}$ that interact with the same entity instances of type $\varepsilon^{(b)}$ with similar strength (as reflected in the edge weights) and vice versa; this is the phenomenon of collaborative filtering. Choosing an order-2 approximation of the convolution operation implies that messages are being passed from the set of nodes for $\varepsilon^{(a)}$ to the set of nodes for $\varepsilon^{(b)}$. With H=2, the convolution operation reduces to:

$$c_w * x = W_0 I x + W_1 \tilde{L} x + W_2 (2 \tilde{L}^2 - I) x.$$

In some embodiments, the number of parameters in the network is further reduced, to avoid overfitting and numerical instabilities, by constraining $W_1=W_0+W_2$, resulting in:

$$c_w * x = W_0(\tilde{L}+1)x + W_2(2\tilde{L}^2 + \tilde{L} - I)x.$$

Given the above convolution operation along with a graph $G^{a,b}$ between two types of entities $\varepsilon^{(a)}$ and $\varepsilon^{(b)}$ and its normalized Laplacian $\tilde{L}^{a,b}$, $D_{CN}$-dimensional embeddings of entity instances can be computed by applying $D_{CN}$ convolutional filters $c_w$ to the graph. Let $F^a \in \mathbb{R}^{|V^a| \times p}$ be the input feature matrix for entity instances of type $\varepsilon^{(a)}$ (i.e., a matrix composed of p-dimensional input vector representations 104 of all entity instances of that type), and let $F^b \in \mathbb{R}^{|V_b| \times q}$ be the input feature matrix (composed of q-dimensional input vector representations) of the entity instances of type $\varepsilon^{(b)}$. Using the graph-convolutional operation then yields:

$$\begin{bmatrix} Z^{(a)} \\ Z^{(b)} \end{bmatrix} = RELU\left( [(\tilde{L}+I)(2\tilde{L}^2 + \tilde{L} - I)] \begin{bmatrix} F^{(a)} & 0 \\ 0 & F^{(b)} \end{bmatrix} W \right),$$

where RELU=max(0, a), and $Z^{(a)} \in \mathbb{R}^{|V^a| \times D_{CN}}$ and $Z^{(b)} \in \mathbb{R}^{|V^b| \times D_{CN}}$ are the feature matrices obtained by applying the convolutional operation, which are composed of $D_{CN}$-dimensional entity vector representations 120 for the entities associated with $\varepsilon^{(a)}$ and $\varepsilon^{(b)}$, respectively. Each column of $W \in \mathbb{R}^{(|V^a|+|V^b|) \times D_{CN}}$ corresponds to one convolutional filter of $G^{a,b}$. Thus, the layer 302 in the architecture 300 generates, in the described embodiment, graph-convolutional second-order polynomial ("G2-P2") embeddings (contained in the matrices $Z^{(a)}$, $Z^{(b)}$) for the entity instances associated with graph $G^{a,b}$.

As mentioned, there can be multiple graphs between entity types $\varepsilon^{(a)}$ and $\varepsilon^{(b)}$. For example, relationships such as the "number of papers published" or the "number of papers cited" in a conference by an author may be represented by two different graphs. In layer 314 of the architecture 300 (herein also the "embedding merge layer"), the (G2-P2) entity embeddings for a given first entity type that emerge from relationships with a given second entity type (which may, in special cases, be the same entity type as the first) are merged across all those relationships (i.e., across all graphs between the first and second entities). For example, with reference to FIG. 3, all entity embeddings 308 of entities in $\varepsilon^{(a)}$ with regard to $\varepsilon^{(b)}$ are merged into merged entity embeddings 316; all entity embeddings 309 of entities in $\varepsilon^{(b)}$ with regard to $\varepsilon^{(a)}$ are merged into merged entity embeddings 317; all entity embeddings 310 of entities in $\varepsilon^{(a)}$ with regard to $\varepsilon^{(c)}$ are merged into merged entity embeddings 318; and all entity embeddings 311 of entities in $\varepsilon^{(c)}$ with regard to $\varepsilon^{(a)}$ are merged into merged entity embeddings 319.

The merging can be accomplished, e.g., by first concatenating the entity embeddings of the first type with regard to the second type, and then merging them using a fully connected neural network layer. Formally, with $\mathcal{G}^{a,b}$ denoting the set of graphs between entity types $\varepsilon^{(a)}$ and $\varepsilon^{(b)}$, the entity embeddings for entity instances of $\varepsilon^{(a)}$ computed with regard to those of $\varepsilon^{(b)}$ are merged, and the same is done for the entity instance of $\varepsilon^{(b)}$ with regard to those of $\varepsilon^{(a)}$. Written, jointly for all entity instances of $\varepsilon^{(a)}$ and $\varepsilon^{(b)}$, in the form of the feature matrices, the merging can be expressed as:

$$\tilde{Z}^{a,b} = \begin{bmatrix} \tilde{Z}^{(a)} \\ \tilde{Z}^{(b)} \end{bmatrix} = RELU\left( \begin{bmatrix} Z_1^{(a)} & \cdots & Z_{|\mathcal{G}^{a,b}|}^{(a)} \\ Z_1^{(b)} & \cdots & Z_{|\mathcal{G}^{a,b}|}^{(b)} \end{bmatrix} \begin{bmatrix} W^{(a)} \\ W^{(b)} \end{bmatrix} + \begin{bmatrix} c^{(a)} \\ c^{(b)} \end{bmatrix} \right),$$

where $\tilde{Z}^{a,b} \in \mathbb{R}^{(|V^a|+|V^b|) \times D_{MN}}$, with $D_{MN}$ being the embedding dimension of the embedding-merge layer 314, represents the collection of merged embeddings of all entities in $\varepsilon^{(a)}$ with regard to $\varepsilon^{(b)}$ and of all entities in $\varepsilon^{(a)}$ with regard to $\varepsilon^{(b)}$. The $W^{(a)}$, $W^{(b)} \in \mathbb{R}^{(|\mathcal{G}^{a,b}| \cdot D_{CN}) \times D_{MN}}$ and $c^{(a)}$, $c^{(b)} \in \mathbb{R}^{D_{MN}}$ are the weights and biases of the embedding-merge layer 314. Note that different values of $D_{MN}$ may be chosen for different entity types.

Having merged entity embeddings across graphs between a given pair of entity types, merged entity embeddings are combined across the sub-entities of an item and augmented, if applicable, with an embedding of the dynamic component 106 of the item, in layer 320 (herein also the "static-dynamic layer"), to create item vector representations 122. The combination can, for example, take the form of a concatenation of the respective vector representations. Thus, the first and second items may be represented as:

$$\Phi(\mathcal{U}) = [\tilde{z}_u^{1,1}, \tilde{z}_u^{1,2}, \ldots, \tilde{z}_u^{E,E}, \zeta_{\mathcal{U}}] \in \mathbb{R}^{\tilde{D}_1} \text{ and}$$

$$\Phi(\mathcal{I}) = [\tilde{z}_j^{1,1}, \tilde{z}_j^{1,2}, \ldots, \tilde{z}_j^{E,E}, \mathcal{V}_{\mathcal{I}}] \in \mathbb{R}^{\tilde{D}_2},$$

where $\tilde{z}_u^{i,j}$, $\tilde{z}_j^{i,j}$ are the merged embeddings of $\mathcal{U}$ or $\mathcal{I}$, respectively, from all graphs between $\varepsilon^{(i)}$ and $\varepsilon^{(j)}$, and where, if an item does not include instances of $\varepsilon^{(i)}$ as sub-entities or there is no relationship between $\varepsilon^{(i)}$ and $\varepsilon^{(j)}$, the corresponding $\tilde{z}_u^{i,j}$ or $\tilde{z}_j^{i,j}$ are taken to be zero. For example, there may be user-author graphs and user-conference graphs, but not author-conference graphs; in that case, the merged embeddings for author-conference graphs will be zero. The layers 314, 320 collectively implement an embodiment of the merging component 112.

The item vector representations $\Phi(\mathcal{U})$ and $\Phi(\mathcal{I})$, e.g., in the form of a concatenated vector $[\Phi(\mathcal{U}); \Phi(\mathcal{I})]$ (herein also the "static-dynamic content embedding" of the pair of first and second items), are provided as input to a classifier neural network 322. The classifier neural network 322 may be, e.g., an MIT that computes a relevance score for the pair of first and second items according to:

$$s(\mathcal{U}, \mathcal{I}) = \sigma(RELU(RELU([\Phi(\mathcal{U}); \Phi(\mathcal{I})]W_1)W_2)W_3),$$

where $W_1 \in \mathbb{R}^{(\tilde{D}_1+\tilde{D}_2) \times m_1}$, $W_2 \in \mathbb{R}^{m_1 \times m_2}$, $W_3 \in \mathbb{R}^{m_2}$ are the network weights in the MLP layers, and $\sigma$ is the sigmoid function (for a binary classification problem).

Figure 4:
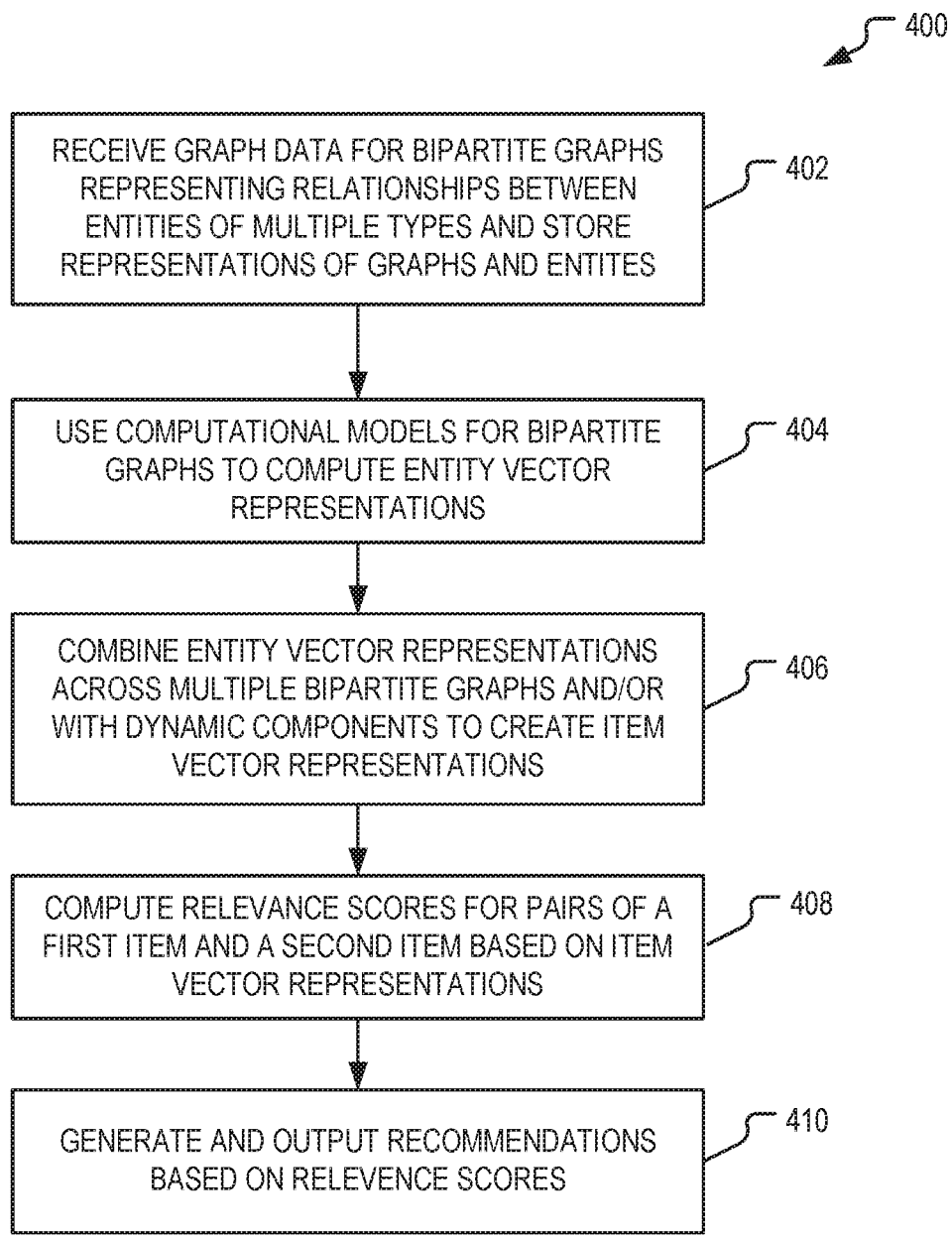
FIG. 4 is a flow chart of a method of generating recommendations in accordance with various embodiments.

FIG. 4 summarizes, in the form of a flow chart, a method 400 of generating recommendations in accordance with various embodiments. The method 400 may be performed by a recommendation system 100 as shown in FIG. 1, which may implement, e.g., the neural-network architecture 300 shown in FIG. 3. The method 400 involves receiving, as input, graph data for bipartite graphs representing relationships between entity instances of multiple entity types, and storing representations of the graphs and entity instances in memory (act 402). Further, the method 400 includes operating on the stored representations, using computational models 110 for the bipartite graphs to compute entity vector representations for the entity instances (e.g., entity embeddings $Z^{(a)}$, $Z^{(b)}$ as defined above for a graph $G^{a,b}$) (act 404). In various embodiments, these computational models are or include graph-based CNNs, although other types of models, such as, e.g., graph-based recursive neural networks (GRNNs) or meta-path-based models (e.g., metapath2vec) may also be used.

Based on definitions of first and second items (i.e., items to receive recommendations and items to be recommended) in terms of their constituent static sub-entities and/or dynamic components, the entity vector representations are combined across bipartite graphs and, if applicable, with representations of the dynamic components, in act 406

(performed by merging component 112), to generate item vector representations for the first and second items. In some embodiments, this act involves merging entity vector representations computed for instances of a given first entity type relative to instances of a given second entity type across multiple bipartite graphs reflecting multiple respective relationships between the pair of entity types, e.g., using an embedding-merge layer 314 that may include a fully connected neural network. Further, for items that include multiple static sub-entities and/or a dynamic component in addition to the static sub-entity or -entities, the merged entity vector representations and/or dynamic component may be concatenated, e.g., in static-dynamic layer 320. Alternatively, entity vector representations may be combined with each other and/or with dynamic components in other ways, e.g., using outer products. Relevance scores for pairs of a first item and a second item are then computed based on the corresponding item vector representations (act 408), using a classifier model 114,322, such as an MIT, recursive neural network (RNN) or other neural-network model, kernel support vector machine or other type of classifier. Once the pairs of items have been scored according to relevance of the second item to the first item, recommendations are generated based on the relevance scores and output (act 410), e.g., to a user or another computational component. Generating the recommendations may, for example, involve ranking and/or filtering based on the scores.

Depending on the particular application, acts 404-410 may be precomputed or computed (e.g., in real-time) in response to some trigger event. For example, in some cases, entity vector representations for the static entities are precomputed based on the bipartite graphs and stored for later use in response to a trigger event such as, e.g., a request for recommendations to a given first item (e.g., a certain user) or receipt of a new second item (e.g., a new message). In response to a recommendation request by a user, for instance, item vector representations for that user and for some or all second items (e.g., a subset of second items resulting from some preliminary filtering) may be created and scored, in pairs, according to relevance. Similarly, addition of a new item to be recommended may trigger the computation of item vector representations for that item and at least a subset of first items (e.g., for a new message, a subset of users potentially interested in the message) and scoring of the first items according to relevance of the second item to the first items. In some embodiments, the computation of entity vector representations based on the bipartite graphs is likewise performed upon a trigger event. For example, upon sign-up of a new user to a social network, graphs associated with users and/or other entities (e.g., publications authored by the users) may be updated to include the new users, and entity vector representations may then be computed (or recomputed) from the updated graphs.

The computational models and algorithms used in generating recommendations in accordance herewith, such as the neural-network architecture 300, may be trained based on labeled training data:

$$\mathcal{D} = \{(\mathcal{U}_1, \mathcal{I}_1, y_1), \ldots, (\mathcal{U}_n, \mathcal{I}_n, y_n)\},$$

where $y_i$ is the label of the i-th pair of first and second items in the dataset, which can be, for instance, any integer number between 1 and C for a multi-class problem (as which many real-world problems can be cast). (Alternatively, to allow for comparisons on various dimensions, the labels $y_i$ could be cast as vectors of C real numbers.) Given $\mathcal{D}$, entities $\varepsilon^{(1)}, \ldots, \varepsilon^{(E)}$, and graphs $\mathcal{G}$, the goal of training is to find a scoring function $s(\mathcal{U}, \mathcal{I})$ that works best, in accordance with a certain metric $\mathcal{M}(\mathcal{D})$, for computing relevance scores for pairs $(\mathcal{U}, \mathcal{I})$. For example, for binary or real-valued labels $y_i$, the goal may be that the computed scores are consistent with the training data, such that $(s(\mathcal{U}_i, \mathcal{I}_i) > s(\mathcal{U}_j, \mathcal{I}_j)$ if $y_i > y_j$.

For some recommendation problems, the performance of the described approach can be adequately evaluated with conventional metrics such as, e.g., the area under the curve (AUC), normalized discounted cumulative gain (NDCG), precision@k, or other metrics known to those of ordinary skill in the art. Many important recommendation problems, however, are characterized by imbalanced data, where the number of irrelevant items far exceeds the number of relevant items (where the notion of relevance may, e.g., account for a cut-off for the number of items that are to be recommended at a given time). In the context of a message recommendation system, for instance, the number of messages that users desire to have surfaced within a given time period (e.g., a day) may be merely a small fraction of the number of new messages submitted to the system during that time. In this and similar circumstances, it is important that the k top-scoring items (hereinafter the "top-k" items), which are the items that will be recommended, not only include highly relevant items, but also avoid irrelevant items (since irrelevant items would needlessly occupy space otherwise available to the next-most relevant items). AUC does not capture this aspect.

In accordance with various embodiments, therefore, a new metric, hereinafter termed "AUC-Rel@k," is used to optimize and/or evaluate the performance of the recommendation algorithm. To define this metric, consider a set of n labeled data points $(x_1, y_1), \ldots, (x_n, y_n)$, where $x_i \in \chi$ denotes pairs $(\mathcal{U}_i, \mathcal{I}_i)$ of first and second items, and $y_i \in \{0,1\}$ is a binary label indicating whether a pair is relevant (1) or irrelevant (0). Let $n_+$ and $n_-$ be the numbers of positively labeled (1) and negatively labeled (0) data points. Further, consider a scoring function $s: \chi \to \mathbb{R}$, and let $\gamma_s$ be the permutation that sorts data points according to the scores given by s and $(x_{\gamma_s}(i), y_{\gamma_s}(i))$ be the data points as resorted by $\gamma_s$, such that $s(x_{\gamma_s}(i)) \geq s(x_{\gamma_s}(j))$ if $i \geq j$. With these notations, define:

$$S(s, i) := \{j : s(x_{\gamma_s}(j)) \geq s(x_{\gamma_s}(i))\},$$

$$T_{k,n}(s, i) := \begin{cases} 1, & \text{if } |S(s, i)| < k \\ 0, & \text{otherwise} \end{cases},$$

where S(s, i) denotes the set of items j that are scored higher than item i, and $T_{k,n}(s, i)$ is an indicator function which is one when item i is in the top-k items ordered by score s. Furthermore, define:

$$S^+(s, i) := \{j : s(x_{\gamma_s}(j)) \geq s(x_{\gamma_s}(i)), y_i = y_j = 1\},$$

$$T^+_{k,n}(s, i) := \begin{cases} 1, & \text{if } |S^+(s, i)| < \min(k, n_+) \\ 0, & \text{otherwise} \end{cases},$$

where $S^+(s, i)$ denotes the set of positively labeled items j that are scored higher than positively labeled item i, and $T^+_{k,n}(s, i)$ is an indicator function which is one when item i is in the top-min(k, $n_+$) (i.e., the top-k or the top-$n_+$, whichever is smaller) positively labeled items ordered by score s.

Now, suppose that the number of positives and negatives in the top-k elements (sorted by s) are $k_+$ and $k_-$, respectively. Then, AUC-Rel@k is defined as:

$$AUC-Rel@k(s) = \frac{\Sigma_{i:y_i=1}\Sigma_{j:y_j=0}T^+_{k,n}(s,i)T_{k,n}(s,j)\mathbb{I}[s(x_{\gamma_S}(i)) \geq s(x_{\gamma_S}(j))]}{k\_\min(k, n_+)},$$

where $\mathbb{I}$ is an indicator function that is one when the condition in square brackets is met. This metric considers pairwise comparisons between irrelevant items in the top-k items vs, the top-min(k, $n_+$) relevant items (sorted by score s), and computes how many times a relevant item has secured a higher score than an irrelevant item in the pairwise comparison. Thus, AUC-Rel@k rewards the presence of every relevant item in the top-k items, and penalizes the presence of irrelevant items in the top-k items over relevant items outside the top-k. Note that AUC-Rel@k is upper-bounded by AUC@k (that is, the AUC computed only for the top-k items), as AUC-Rel@k considers more pairwise comparisons than AUC@k, namely comparisons of relevant items beyond the top-k with irrelevant items in the top-k, which are always lost (i.e., amount to zero) while being counted towards the normalization (i.e., the denominator). It can be shown that:

$$AUC-Rel@k(s) = \frac{k_+}{\min(k, n_+)}AUC@k(s) \in [0,1].$$

For multiple first items $\{u_p\}_{p=1}^P$, a Micro version can be defined (in analogy to the conventional AUC@K) as follows:

$$Micro-AUC-Rel@k(s) = \frac{1}{\mathcal{P}}\sum_{\mathcal{P}} AUC-Rel@k_p(s),$$

where AUC-Rel@$k_p$ is AUC-Rel@k computed for items recommended to $\mathcal{U}_p$. Similarly, a Macro version can be defined as follows:

$$Macro-AUC-Rel@k(s) = \frac{\sum_{\mathcal{P}}\sum_{i:y_i=1}\sum_{j:y_j=0}T^+_{k,n_\mathcal{P}}(s,i)T_{k,n_\mathcal{P}}(s,j)\mathbb{I}[s(x_{\gamma_S}(i)) \geq s(x_{\gamma_S}(j))]}{\Sigma_\mathcal{P} k_\mathcal{P} \Sigma_\mathcal{P} \min(k, n_{\mathcal{P}+})},$$

where the notations have the same meaning as defined above except that they are now corresponding to $\mathcal{U}_p$.

Figure 5:
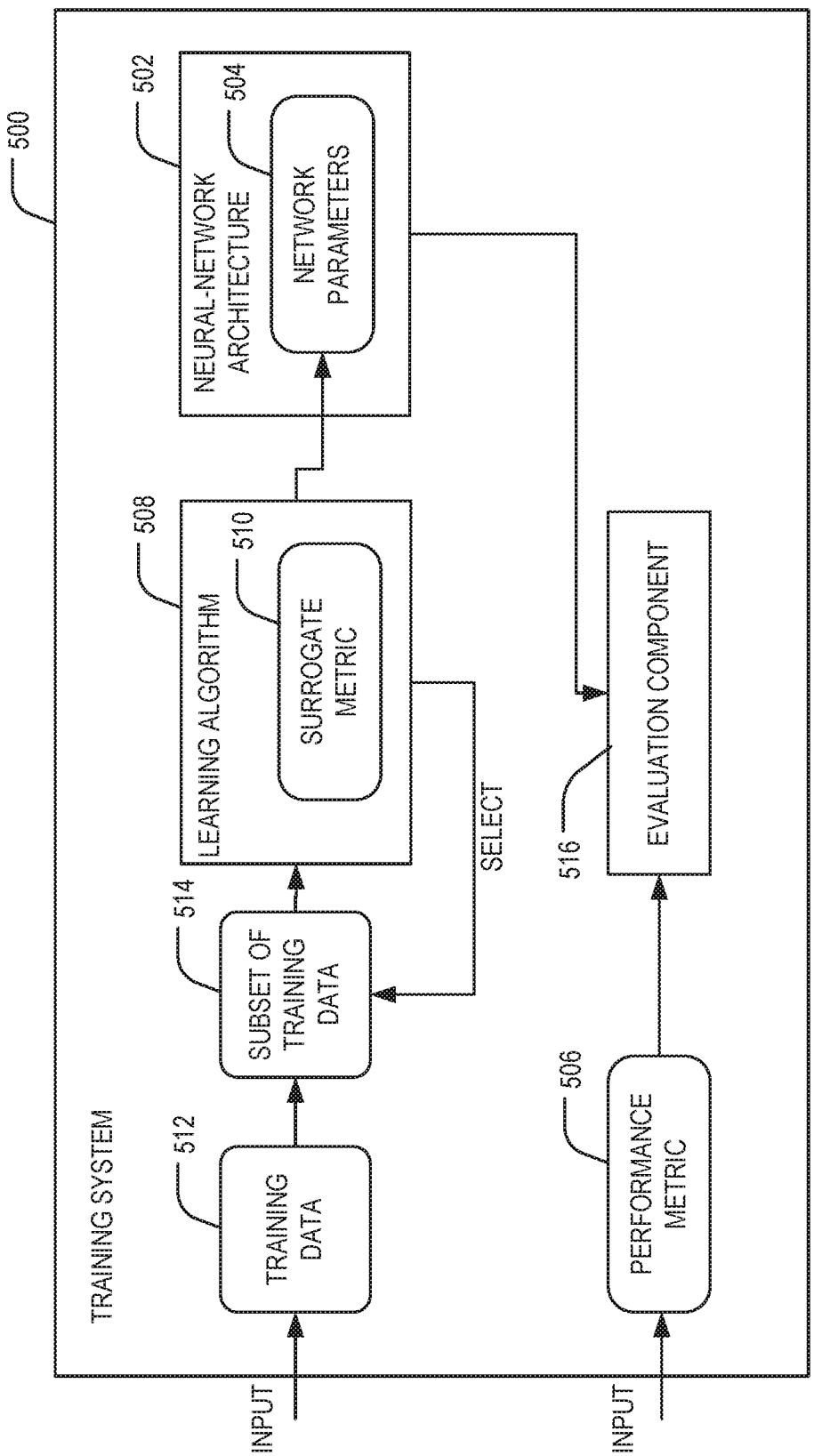
FIG. 5 is a schematic block diagram of a neural-network training system in accordance with various embodiments.

FIG. 5 is a schematic block diagram of an example data processing system, in accordance with various embodiments, for training neural-network components of a recommendation system 100 (e.g., neural-network architecture 300) (hereinafter also "training system" 500). Like the recommendation system 100, the training system 500 can be implemented with a suitable combination of hardware and/or software, such as, e.g., with a general-purpose computer (e.g., as illustrated in FIG. 9), or cluster of computers, storing suitable software in computer memory and executing the software with one or more CPUs or GPUs, or with one more special-purpose processors such DSPs, FPGAs, or ACICs. The training system 500 serves to train a neural-network architecture 502 implementing the computational models 110, merging component 112, and classifier models 114 by optimizing adjustable network parameters 504 of the neural-network architecture 502 for a given metric 506, which may be specified as input to the training system 500. For the neural-network architecture 300 described above with respect to FIG. 3, for example, these adjustable parameters 504 may include the convolutional filter parameters $W \in \mathbb{R}^{(|V^a|+|V^b|) \times D_{CN}}$ (which include the coefficients $W_h$ of the Chebyshev approximation for all $D_{CN}$ filters), the weights $W^{(a)}, W^{(b)} \in \mathbb{R}^{(\xi^{ab}|\cdot D_{CN}) \times D_{MN}}$ and biases $c^{(a)}, c^{(b)} \in \mathbb{R}^{D_{MN}}$ of the embedding merge layer 314, and the weights $W_1 \in \mathbb{R}^{(D_1+D^2) \times m_1}$, $W_2 \in \mathbb{R}^{m_1 \times m_2}$, $W_3 \in \mathbb{R}^{m_2}$ of the MLP (classifier neural network 322) that performs the classification. In some embodiments, the neural-network architecture 502 is trained end-to-end, that is, all network parameters 504 are adjusted jointly in a single process (rather than separate processes for different neural-network components).

Optimization of the parameters 504 involves executing a learning algorithm 508 to iteratively optimize a surrogate metric 510 for the performance metric 506 based on labeled training data 512 provided as input to the training system 500. The learning algorithm 508 may utilize, e.g., back-propagation of errors, which is well-known to those of ordinary skill in the art of machine learning, or any other suitable technique. Conventional performance metrics such as AUC or accuracy can be directly optimized by standard surrogate metrics 510 such as, e.g., cross entropy. This relation does, however, not hold for the above-defined metric AUC-Rel@k, which looks at partial data rather than taking a holistic view of the data as standard surrogate metrics do. In other words, optimizing, e.g., cross-entropy will not, in general, result in optimal AUC-Rel@k. In various embodiments, therefore, as illustrated in FIG. 5, an additional optimization layer is added: Following execution of the learning algorithm 508 with the initial set of training data 512, all pairs of first and second items in the training data 512 are scored using the trained neural-network architecture 502, and the scoring is then used to select (as detailed below) a suitable subset 514 of the training data for another round of networking training using the learning algorithm 508. This process is repeated iteratively, e.g., until a specified number of iterations have been completed. An evaluation component 516 can then quantify the performance of the neural-network architecture 502 thus trained, using AUC-Rel@k as the performance metric 506.

Since the recommendation and training systems 100, 500 both use the neural-network architecture 502, they may, in some embodiments, be integrated with each other and share resources. In other embodiments, the training system 500 and the recommendation system 100 are separate and distinct entities, e.g., where only the training system 500 implements the learning algorithm 508 and only the recommendation system 100 includes the recommendation generator 116. Both of these entities may include respective copies of the neural-network architecture 502, and the network parameters 504 determined for the copy within the training system 500 may, once optimized, be communicated to the recommendation system 100 for use with its copy of the neural network architecture 502. Alternatively, the training system 500 need not include a copy of the neural-network architecture 502 itself, but may instead exchange data with the recommendation system 100 during the training process to directly adjust the network parameters 504 within the recommendation system 100, and once the parameters 504 have been determined, these communications may cease.

Figure 6:
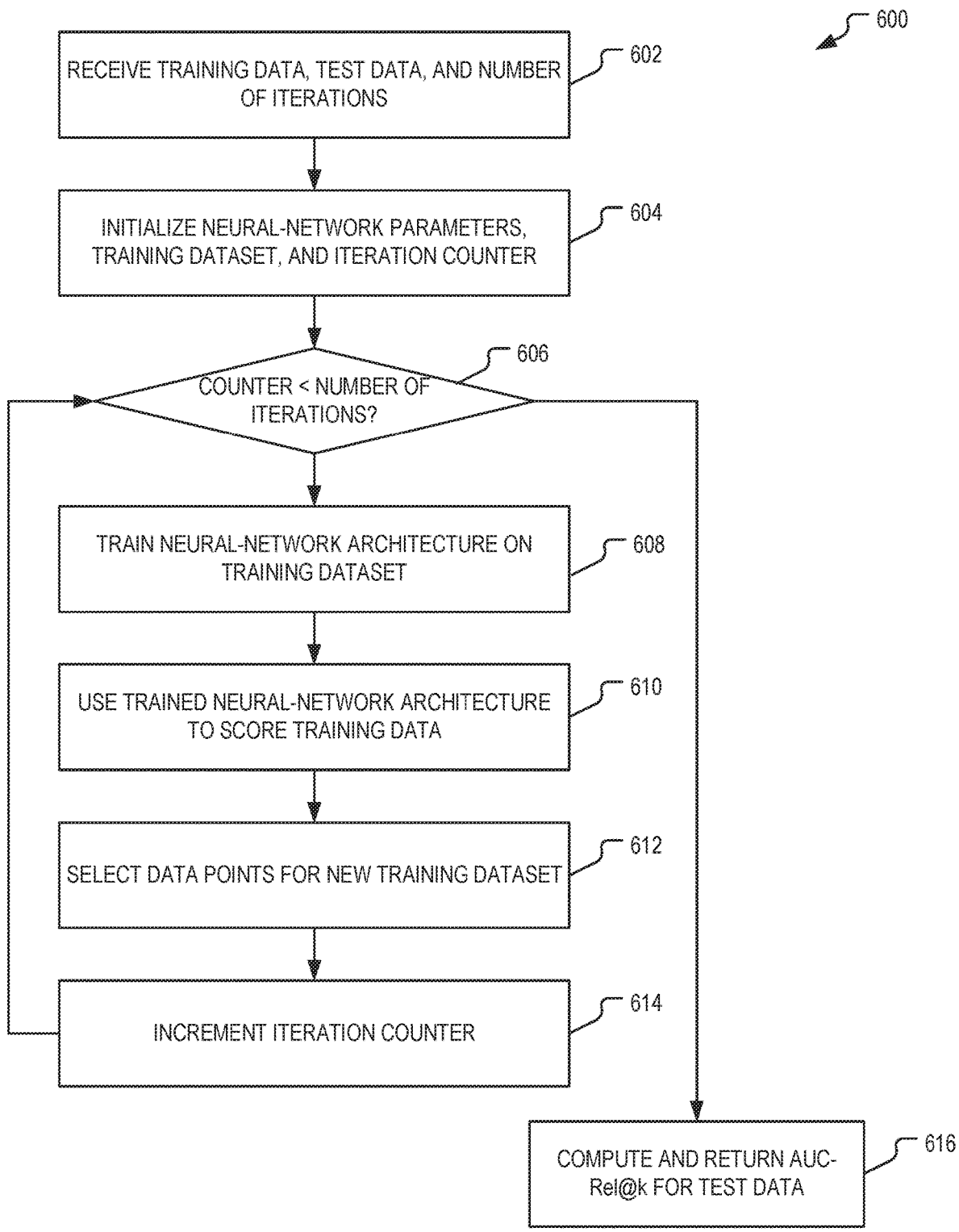
FIG. 6 is a flow chart of a method of training a neural-network architecture for computing recommendations, in accordance with various embodiments.

FIG. 6 is a flow chart illustrating, in more detail, an example method 600 of training a neural-network architecture 502 for computing recommendations to optimize for AUC-Rel@k, in accordance with various embodiments. The method 600 takes training data, test data, and a specified number of iterations as input, and returns a value of AUC-Rel@k as output. After receiving the input (in act 602) and initializing the neural-network parameters 504, the training dataset, and an iteration counter (in act 604), the method 600 enters into an iterative loop that proceeds as long as the iteration counter is below the specified number of iterations (as determined at 606).

In each iteration, the neural-network architecture 502 is trained on the current training dataset, in act 608, to minimize an objective function such as, e.g., the regularized form of the negative log likelihood (corresponding to cross entropy) of the predicted score s($\mathcal{U}$, $\mathcal{I}$):

$$\mathcal{L} = \Sigma_{i=1}^{|D|} -(y_i \log s_i + (1-y_i)\log(1-s_i)) + \tau \Sigma_j \|W_j\|_2,$$

where $s_i = s(\mathcal{U}_i, \mathcal{I}_i)$ are the scores computed by the neural-network architecture 502, $y_i$ are the labels given to datapoint ($\mathcal{U}_i$, $\mathcal{I}_i$) in the training data, $\tau$ is the regularizer, and the second term is a sum of l2-norms of all the weight matrices in the architecture 502. In some embodiments, the weights and subsequent embeddings from multiple bipartite graphs are learned using an Adam optimization algorithm (which is an extension to the stochastic gradient descent technique introduced by D. Kingma et al. in "Adam: A method for Stochastic Optimization," first published on arXiv in 2014 in TensorFlow (an open-source software library for dataflow and differentiable programming that is suitable for various machine-learning applications) with mini-batches. The trained neural-network architecture 502 is used to score all datapoints in the received training data (act 610), and, based on the scores, a subset of the received training data is then selected to serve as the training dataset in the next iteration (act 612), and the iteration counter is incremented (act 614). (In the first iteration, where the neural-network architecture 502 is trained on the full set of received training data, the scoring act 610 may be superfluous. In subsequent iterations, where training is generally based only on a subset of the received training data, there will be datapoints ($\mathcal{U}_i$, $\mathcal{I}_i$) that have not been scored in the course of the immediately preceding network training) More specifically, the dataset for the next iteration includes, in accordance with some embodiments, the "top rel-k" datapoints per first item (e.g., user) $\mathcal{U}$, aggregated across all first items, where "top rel-k" denotes the union of the top-k scored points and up to k positively labeled datapoints that are outside the top-k scored points (for a total of at most 2k datapoints, and fewer datapoints if there are fewer than k positive labeled points outside the top-k.) When the iteration counter has reached the specified number of iterations, training is deemed complete, and the metric AUC-Rel@k is evaluated on the test data and provided as output (act 616). The method 600 indirectly optimizes AUC-Rel@k. As will be appreciated by those of ordinary skill in the art, similar metrics for imbalanced data that likewise penalize irrelevant items in the top-k as well as rewarding relevant items in the top-k may also be optimized using the described process.

The recommendation approach described above with reference to FIGS. 1-6 can be applied to many different problems and entities, such as to recommend relevant research papers for potential citation in a given paper, to recommend groups within a social network or media-sharing platform for users to post images and the like, or to recommend messages to users within a shared enterprise conversation platform, to name just a few.

Figure 7:
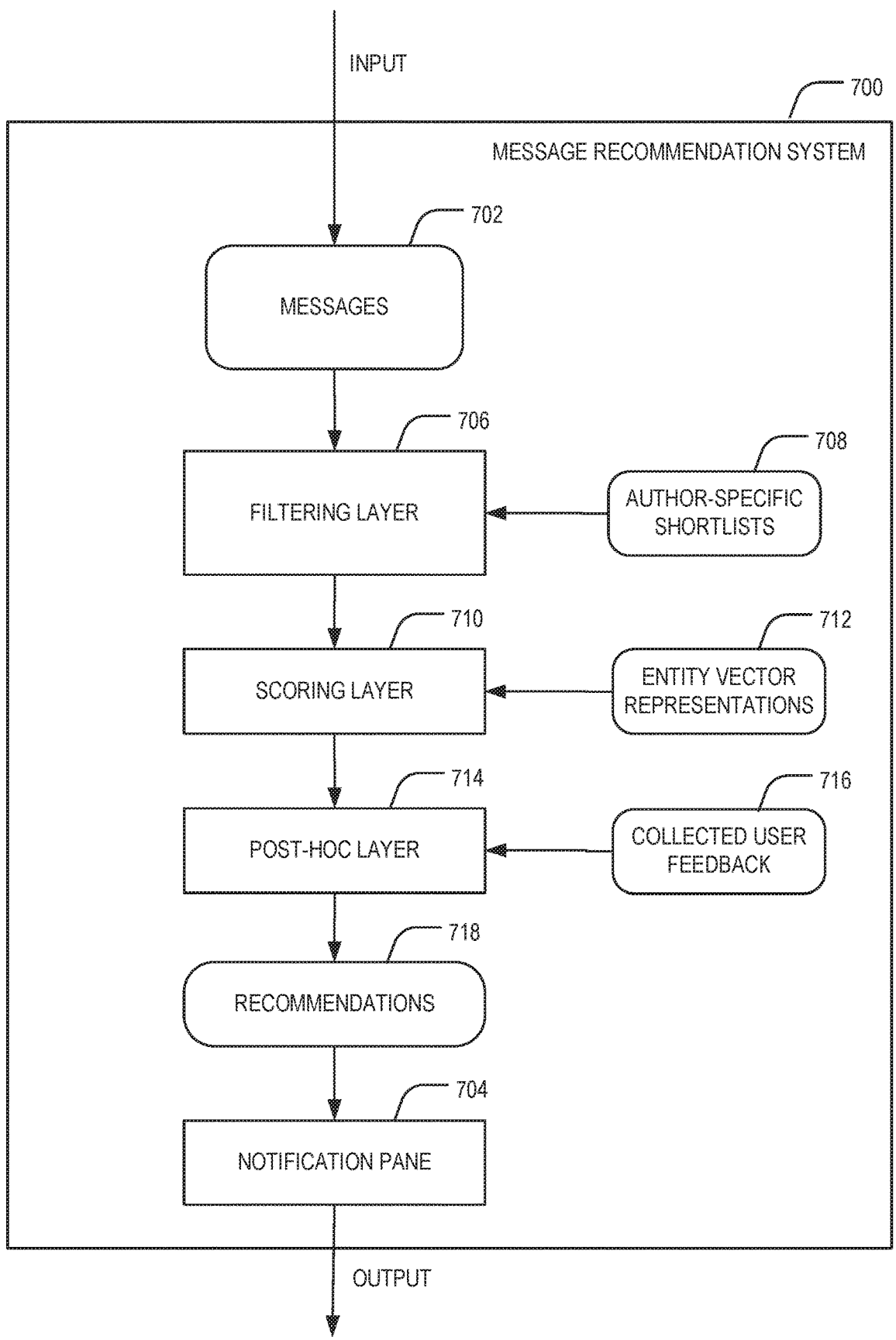
FIG. 7 is a schematic block diagram of a message recommendation system in accordance with various embodiments.
Figure 8:
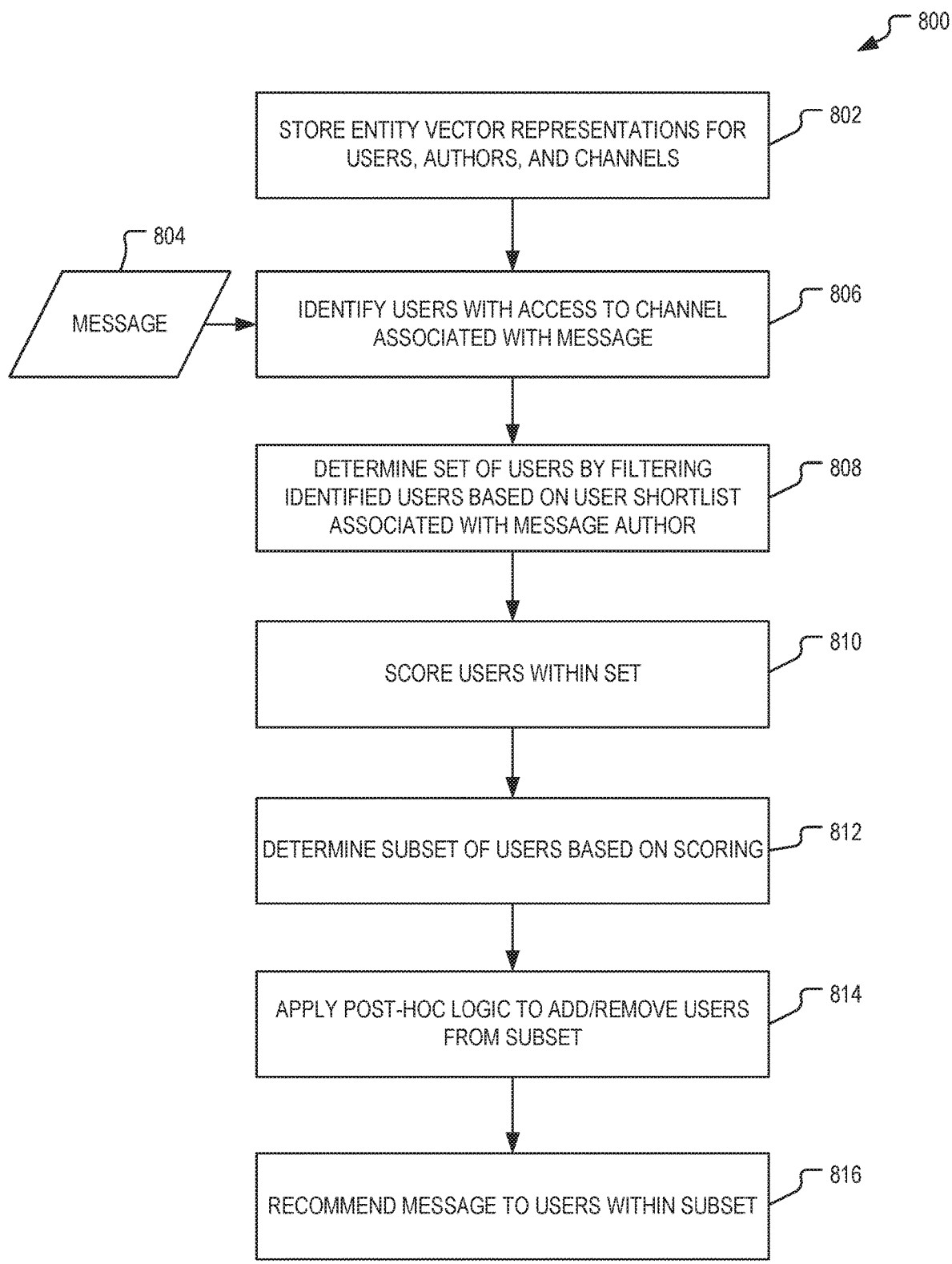
FIG. 8 is a flow chart of a message recommendation method in accordance with various embodiments.

To provide a specific example, FIGS. 7 and 8 illustrate a system and method for message recommendation in an enterprise conversation platform (hereinafter also the "message system") such as, for example and without limitation, the Microsoft Teams® product (by Microsoft Corporation, Redmond, Wash.). Within such a message system, users may each be part of one or more teams, and the teams may build and maintain conversation threads of messages exchanged between the team members, where messages are posted to message channels associated with the teams. In contrast to email communications, which are sent only to explicitly listed recipients, the messages within the channels may be accessible to all members of the associated team (or teams) as a means of facilitating conversation among large teams. Such unrestricted access can, however, lead to an excessively large number of messages that a given user can read, creating significant information overload for the user. As will be appreciated, an accurate recommendation system capable of identifying and surfacing the most relevant messages to the user can address this issue, allowing the user to ignore many (even the vast majority of) messages without risk of missing messages of particular importance to him. As will also be apparent, the AUC-Rel@k metric introduced above, due to its suitability for imbalanced data, provides a good measure of performance for such a system.

The recommendation problem for the described scenario can be stated as learning a function s($\mathcal{U}$, $\mathcal{I}$) that, for a given user $\mathcal{U}$ (the first item) and a given message $\mathcal{I}$ (the second item), predicts whether the user would be interested in the message. In the training data, the label y for any pair ($\mathcal{U}$, $\mathcal{I}$) may be a binary indicator of whether the user has "engaged" with the message, where "engaging" may be defined, e.g., as "liking" or replying to a message. Consider a recommendation system that has three entity types: users $\mathcal{E}^\mathcal{U}$, authors $\mathcal{E}^\mathcal{A}$, and channels $\mathcal{E}^\mathcal{C}$. (Note that sets of users $\mathcal{E}^\mathcal{U}$ and authors $\mathcal{E}^\mathcal{A}$ generally include the same people (or at least overlap), but reflect different roles a user can take: that of recipient of the recommendation and that of author associated with a message.) Given these entities, a user is defined simply by the user entity type: $\mathcal{U} = (\mathcal{E}^\mathcal{U})$; and a message item is defined by the author and channel entity types and a dynamic component v($\mathcal{I}$) representing the content of the message: $\mathcal{I} = (\mathcal{E}^\mathcal{A}, \mathcal{E}^\mathcal{C}, v(\mathcal{I}))$. Further, consider relationships between the entities that are reflected in one or more graphs between three pairs of entities: (1) user-user graphs, with unidirectional edges such as the number of common channels between users, the number of common conversations between users, etc.; (2) user-author graphs, with directional edges such as the number of times a user liked an author's post, replied to an author's post, etc.; and (3) user-channel graphs, with edges capturing interactions such as how many times a user visited a channel in the past month, how many messages a user posted on the channel, etc.

In principle, the above-described recommendation approach (e.g., as implemented using neural-network architecture 300) can be used to score users for a given incoming message to determine the relevance of the message to each user. In practice, however, this application presents challenges. For one thing; the message system may provide state-free message notifications, such that, as soon as a new message comes in, a decision is made as to which users are to be notified of the message. Further, the number of users who can access the channel, and for whom a decision whether or not to surface the message is therefore to be made, can be very large; a popular message channel may, for instance, have thousands of users enrolled. Invoking the scoring function $s(\mathcal{U}, \mathcal{I})$ potentially thousands of times per metric in real-time may not be feasible with the available computational resources.

FIG. 7 is a block diagram of an example data processing system, in accordance with various embodiments; for generating message recommendations (hereinafter also "message recommendation system" 700). Like the recommendation system 100, the message recommendation system 700 can be implemented with a suitable combination of hardware and/or software, such as, e.g., with a general-purpose computer (e.g., as illustrated in FIG. 9), or cluster of computers, storing suitable software in computer memory and executing the software with one or more CPUs or GPUs, or with one or more special-purpose processors such DSPs, FPGAs, or ACICs. The message recommendation system 700 may form part of a larger message system that includes user interfaces for users to enroll with message channels, post and read messages, etc., and that may keep message records and track user engagement with messages. The system 700 takes messages 702 and associated metadata, such as the author and message channel, as input and identifies users to whom the messages should be recommended, e.g., by surfacing them in a notification pane 704. To use the scoring function $s(\mathcal{U}, \mathcal{I})$ in a manner that is computationally tractable, the system 700 integrates the computation of $s(\mathcal{U}, \mathcal{I})$ into a layered architecture designed to reduce computational cost.

In a first layer 706 (herein also "filtering layer"), the initially often large set of users with access to the channel to which a given message was posted is filtered based on an author-specific shortlist 708 of (e.g., a few tens of) users; reducing the pipeline cost by orders of magnitude. The shortlist 708 for a given author lists users to whom messages from that author are potentially relevant, as may be determined, independently from any message content, based on, e.g., the static relationships between users, authors, and channels. In some embodiments, the shortlist is compiled offline based on static user-author features with a learned standard classifier operating on top. To enable fast operation of the filtering layer 706, the shortlists 708 may be precomputed and used for simple look-ups. For a message from a particular author, the scoring function $s(\mathcal{U}, \mathcal{I})$ is then invoked, in the second layer 710 (herein also the "scoring layer"), only, for users on the shortlist 708. The scoring layer 710 may implement, e.g., components of the neural-network architecture 300. In various embodiments, to speed up computation, the scoring layer 710 accesses precomputed entity vector representations 712 for the author, channel, and user, and concatenates them, along with the dynamic component, to create item vector representations to be provided as input to the classifier (corresponding to scoring function s). A third, optional layer 714 (herein also "post-hoc layer") achieves a personalized delivery model by taking explicit user feedback 716 (e.g., . . . , collected over time) into account when creating the final set of users that will be notified of the message, e.g., by adding message back or removing messages from the set of messages deemed relevant. The computed recommendations 718 can be sent to the notification pane 704 for output to the respective users, FIG. 8 is a flow chart of an example message recommendation method 800 (e.g., as performed by the message recommendation system 700), in accordance with various embodiments. The method 800 involves storing precomputed entity vector representations for users, authors, and channels (act 802). Upon receipt of a message 804, users with access to a channel associated with the message are identified (act 806), and the identified users are then filtered, e.g., based on a user shortlist 708 associated with the author of the message, to create a set of users that, in general, includes a much smaller number of users than have access to the message (act 808). The users within this smaller set are scored according to the relevance of the message to each of the users (act 810), The scoring may involve computing item vector representations for the message and for all users within the set, and applying a classifier model to the item vector representations (e.g., as shown in FIG. 3). A generally even smaller subset of the scored users is then determined based on the scoring (act 812), e.g., by retaining only users for whom the score exceeds a certain threshold value. The threshold value may be user-dependent, and may set empirically to achieve, at least on average, a desired number of messages that will be surfaced to the user in the notification pane. Post-hoc logic may be applied to the subset of users to add and/or remove users (act 814). For example, if, the user desires to see fewer or more messages from a particular author or from a particular channel, then we can remove such messages from, or add such messages to, our sorted list of messages. Other examples of suitable post-hoc logic to refine the message recommendations will occur to those of ordinary skill in the art. Finally, the message is recommended to all users remaining within the refined subset (act 816).

In general, the operations, algorithms, and methods described herein may be implemented in any suitable combination of software, hardware, and/or firmware, and the provided functionality may be grouped into a number of components, modules, or mechanisms. Modules and components can constitute either software components (e.g., code embodied on a non-transitory machine-readable medium) or hardware-implemented components. A hardware-implemented component is a tangible unit capable of performing certain operations and can be configured or arranged in a certain manner. In example embodiments, one or more computer systems (e.g., a standalone, client, or server computer system) or one or more processors can be configured by software (e.g., an application or application portion) as a hardware-implemented component that operates to perform certain operations as described herein.

In various embodiments, a hardware-implemented component can be implemented mechanically or electronically. For example, a hardware-implemented component can comprise dedicated circuitry or logic that is permanently configured (e.g., as a special-purpose processor, such as a field programmable gate array (FPGA) or an application-specific integrated circuit (ASIC)) to perform certain operations. A hardware-implemented component can also comprise programmable logic or circuitry (e.g., as encompassed within a general-purpose processor or other programmable processor) that is temporarily configured by software to perform certain operations. It will be appreciated that the decision to implement a hardware-implemented component mechanically, in dedicated and permanently configured circuitry, or in temporarily configured circuitry configured by software) can be driven by cost and time considerations.

Accordingly, the term "hardware-implemented component" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented components are temporarily configured (e.g., programmed), each of the hardware-implemented components need not be configured or instantiated at any one instance in time. For example, where the hardware-implemented components comprise a general-purpose processor configured using software, the general-purpose processor can be configured as respective different hardware-implemented components at different times. Software can accordingly configure a processor, for example, to constitute a particular hardware-implemented component at one instance of time and to constitute a different hardware-implemented component at a different instance of time.

Hardware-implemented components can provide information to, and receive information from, other hardware-implemented components. Accordingly, the described hardware-implemented components can be regarded as being communicatively coupled. Where multiple such hardware-implemented components exist contemporaneously, communications can be achieved through signal transmission (e.g., over appropriate circuits and buses that connect the hardware-implemented components). In embodiments in which multiple hardware-implemented components are configured or instantiated at different times, communications between such hardware-implemented components can be achieved, for example, through the storage and retrieval of information in memory structures to which the multiple hardware-implemented components have access. For example, one hardware-implemented component can perform an operation and store the output of that operation in a memory device to which it is communicatively coupled. A further hardware-implemented component can then, at a later time, access the memory device to retrieve and process the stored output. Hardware-implemented components can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented components that operate to perform one or more operations or functions. The components referred to herein can, in some example embodiments, comprise processor-implemented components.

Similarly, the methods described herein can be at least partially processor-implemented. For example, at least some of the operations of a method can be performed by one of processors or processor-implemented components. The performance of certain of the operations can be distributed among the one or more processors, not only residing within a single machine, but deployed across a number of machines. In some example embodiments, the processor or processors can be located in a single location (e.g., within an office environment, or a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., application program interfaces (APIs)).

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of description language, including compiled or interpreted languages, and it can be deployed in any form, including as a standalone program or as a component, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

FIG. 9 is a block diagram of an example computing system as may be used to implement the systems of FIGS. 1, 5, and 7, in accordance with various embodiments. In alternative embodiments, the computing system may be a machine operating as a standalone device or, alternatively, connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 can further include a video display 910 (e.g., a liquid crystal display (LCD) or a cathode ray tube (CRT)). The computer system 900 also includes an alpha-numeric input device 912 (e.g., a keyboard or a touch-sensitive display screen), a user interface (UI) navigation (or cursor control) device 914 (e.g., a mouse), a disk drive unit 916, a signal generation device 918 (e.g., a speaker), and a network interface device 920.

The disk drive unit 916 includes a machine-readable medium 922 on which are stored one or more sets of data structures and instructions 924 (e.g., software) embodying or utilized by any one or more of the methodologies or functions described herein. The instructions 924 can also reside, completely or at least partially, within the main memory 904 and/or within the processor 902 during execution thereof by the computer system 900, with the main memory 904 and the processor 902 also constituting machine-readable media.

While the machine-readable medium 922 is shown in an example embodiment to be a single medium, the term "machine-readable medium" can include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 924 can be transmitted or received over a communication network 926 using a transmission medium. The instructions 924 can be transmitted using the network interface device 920 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

The following numbered examples are illustrative embodiments.

1. A method, performed by a data processing system; for generating recommendations between a plurality of first items and a plurality of second items, wherein the first items are defined at least in part by respective entity instances of a first subset of multiple entity types and the second items are defined at least in part by respective entity instances of a second subset of the multiple entity types. The method comprises: storing, in computer memory of the data processing system, representations of bipartite graphs representing relationships between entity instances of the multiple entity types; scoring; by one or more computer processors of the data processing systems, pairs of a first item and a second item according to relevance of the second item to the first item by using computational models for the bipartite graphs to compute entity vector representations of the entity instances of the entity types of the first and second subsets, wherein the first and second items each have multiple associated entity vector representations corresponding to multiple respective bipartite graphs; generating item vector representations of the first items at least in part by combining the associated entity vector representations of the respective entity instances of the first subset and generating item representations of the second items at least in part by combining the associated entity vector representations of the respective entity instances of the second subset; and using a classifier model to compute relevance scores for pairs of a first item and a second item from the respective item vector representations; and outputting recommendations of the second items to the first items based on the relevance scores.

2. The method of example 1, wherein the computational models for the bipartite graphs comprise graph-based convolutional neural networks.

3. The method of example 2, wherein the entity vector representations are second-order polynomial graph-convolutional embeddings.

4. The method of any of examples 1-3, wherein the classifier model comprises a classifier neural network.

5. The method of example 4, wherein the classifier neural network comprises a multi-layer perceptron.

6. The method of any of examples 1-5, wherein combining the entity vector representations comprises using a fully connected neural network to merge entity vector representations computed for entity instances of a given entity type of a pair of entity types across multiple bipartite graphs representing multiple respective relationships between the entity instances of that pair of entity types.

7. The method of any of examples 1-6, wherein at least one of the first or second subsets comprises at least two entity types, and wherein combining the entity vector representations comprises concatenating the entity vector representations of the entity instances of the at least two entity types.

8. The method of any of examples 1-7, wherein at least one of the first items or the second items are defined further by a dynamic component, and wherein generating the item vector representations of the at least one of the first items or the second items further comprises concatenating vector representations of respective instances of the dynamic component with the respective combined entity vector representations.

9. The method of any of example 1-9, wherein computational models used in scoring the pairs of a first item and a second item, including the computational models for the bipartite graphs and the classifier model, are trained end-to-end.

10. A system for generating recommendations between a plurality of first items and a plurality of second items, wherein the first items are defined at least in part by respective entity instances of a first subset of multiple entity types and the second items are defined at least in part by respective entity instances of a second subset of the multiple entity types, the system comprising: computer memory storing representations of bipartite graphs representing relationships between entity instances of the multiple entity types; and a computer processor executing instructions stored in the computer memory to perform operations for scoring pairs of a first item and a second item according to relevance of the second item to the first item, the operations comprising: using computational models for the bipartite graphs to compute entity vector representations of the entity instances of the entity types of the first and second subsets, wherein the first and second items each have multiple associated entity vector representations corresponding to multiple respective bipartite graphs; generating item vector representations of the first items at least in part by combining the associated entity vector representations of the respective entity instances of the first subset and generating item representations of the second items at least in part by combining the associated entity vector representations of the respective entity instances of the second subset; using a classifier model to compute relevance scores for pairs of a first item and a second item from the respective item vector representations; and causing an output of recommendations of the second items to the first items based on the relevance scores.

11. The system of example 10, wherein the computational models for the bipartite graphs comprise graph-based convolutional neural networks.

12. The system of example 11, wherein the entity vector representations are second-order polynomial graph-convolutional embeddings.

13. The system of any of examples 10-12, wherein the classifier model comprises a classifier neural network.

14. The system of example 13, wherein the classifier neural network comprises a multi-layer perceptron.

15. The system of any of examples 10-14, wherein combining the entity vector representations comprises using a fully connected neural network to merge entity vector representations computed for entity instances of a given entity type of a pair of entity types across multiple bipartite graphs representing multiple respective relationships between the entity instances of that pair of entity types.

16. The system of any of examples 10-15, wherein at least one of the first or second subsets comprises at least two entity types, and wherein combining the entity vector representations comprises concatenating the entity vector representations of the entity instances of the at least two entity types.

17. The system of any of examples 10-16, wherein at least one of the first items or the second items are defined further by a dynamic component, and wherein generating the item vector representations of the at least one of the first items or the second items further comprises concatenating vector representations of respective instances of the dynamic component with the respective combined entity vector representations.

18. The system of any of examples 10-17, wherein computational models used in scoring the pairs of a first item and a second item, including the computation models for the bipartite graphs and the classifier model, are trained end-to-end.

19. One or more computer-readable media for generating recommendations between a plurality of first items and a plurality of second items, wherein the first items are defined at least in part by respective entity instances of a first subset of multiple entity types and the second items are defined at least in part by respective entity instances of a second subset of the multiple entity types, the one or more computer-readable media storing: representations of bipartite graphs representing relationships between entity instances of the multiple entity types; and processor-executable instructions which, when executed by one or more computer processors, cause the one or more computer processors to perform operations for scoring pairs of a first item and a second item according to relevance of the second item to the first item, the operations comprising: using computational models for the bipartite graphs to compute entity vector representations of the entity instances of the entity types of the first and second subsets, wherein the first and second items each have multiple associated entity vector representations corresponding to multiple respective bipartite graphs; generating item vector representations of the first items at least in part by combining the associated entity vector representations of the respective entity instances of the first subset and generating item representations of the second items at least in part by combining the associated entity vector representations of the respective entity instances of the second subset; using a classifier model to compute relevance scores for pairs of a first item and a second item from the respective item vector representations; and causing an output of recommendations of the second items to the first items based on the relevance scores.

20. The one or more computer-readable media of example 19, wherein the computational models for the bipartite graphs comprise graph-based convolutional neural networks.

21. A system for generating recommendations between a plurality of first items and a plurality of second items, wherein the first items are defined at least in part by respective entity instances of a first subset of multiple entity types and the second items are defined at least in part by respective entity instances of a second subset of the multiple entity types, the system comprising: means for storing representations of bipartite graphs representing relationships between entity instances of the multiple entity types; means for scoring pairs of a first item and a second item according to relevance of the second item to the first item by using computational models for the bipartite graphs to compute entity vector representations of the entity instances of the entity types of the first and second subsets, wherein the first and second items each have multiple associated entity vector representations corresponding to multiple respective bipartite graphs; means for generating item vector representations of the first items at least in part by combining the associated entity vector representations of the respective entity instances of the first subset and generating item representations of the second items at least in part by combining the associated entity vector representations of the respective entity instances of the second subset; means for using a classifier model to compute relevance scores for pairs of a first item and a second item from the respective item vector representations; and means for outputting recommendations of the second items to the first items based on the relevance scores.

22. A method for determining, within a message system in which messages are each assigned to one or more of a plurality of message channels and a plurality of users each have access to one or more of the plurality of message channels, recommendations of messages to users, the method comprising: storing, in computer memory, vector representations of the plurality of users, a plurality of authors, and the plurality of message channels, the vector representations computed based on bipartite graphs each representing a relationship between a combination of the users, authors, and message channels; and using a computer processor to identify, for each of a plurality of messages, one or more of the plurality of users to whom the message is to be recommended, by: filtering, among the plurality of users, users having access to a message channel to which the message is assigned based on a user shortlist associated with an author of the message to determine a set of users, the user shortlist based on a determination of relevance of messages from the author to users on the shortlist; scoring the message for each user of the set of users with a classifier model that takes a vector representation of a content of the message and the vector representations of the user, the author of the message, and the message channel associated with the message as input; and determining based on the scoring, as a subset of the set of users, the one or more of the plurality of users to whom the message is to be recommended.

23. The method of example 22, wherein identifying the one or more users to whom the message is to be recommended further comprises at least one of adding one or more users to the subset or removing one or more users from the subset based on user feedback received on previous message recommendations.

24. The method of example 22 or example 23, wherein the bipartite graphs include one or more bipartite graphs representing relationships between users, one or more bipartite graphs representing relationships between users and authors, and one or more bipartite graphs representing relationships between users and channels.

25. The method of any of examples 22-24, wherein the vector representations of the plurality of users, the plurality of authors, and the plurality of message channels are computed with graph-based convolutional neural networks for the bipartite graphs.

26. The method of any of examples 22-25, wherein the graph-based convolutional neural networks and a classifier neural network of the classifier model have been trained end-to-end based on training data comprising pairs of a user and a message along with indications whether the message is relevant to the user.

27. The method of example 26, wherein the graph-based convolutional neural networks and classifier neural network have been trained to optimize a recommendation-performance metric that, for each user, rewards occurrence of a relevant message in a specified number of top-scoring messages for the user and penalizes occurrence of an irrelevant message in the specified number of top-scoring messages for the user.

28. The method of any of examples 22-27, wherein the classifier model is a classifier neural network taking a concatenation of the embedding of the content of the message and the vector representations of the user, the author of the message, and the message channel associated with the message as input.

29. The method of any of examples 22-28, wherein the one or more users to whom the message is to be recommended are identified in real-time upon posting of the message to the associated message channel.

30. A recommendation system for determining, within a message system in which messages are each assigned to one or more of a plurality of message channels and a plurality of users each have access to one or more of the plurality of message channels, recommendations of messages to users, the system comprising: computer memory storing vector representations of the plurality of users, a plurality of authors, and the plurality of message channels, the vector representations computed based on bipartite graphs each representing a relationship between a combination of the users, authors, and message channels; and a computer processor executing instructions stored in the computer memory to perform operations for identifying, for each of a plurality of messages, one or more of the plurality of users to whom the message is to be recommended, the operations comprising: filtering, among the plurality of users, users having access to a message channel to which the message is assigned based on a user shortlist associated with an author of the message to determine a set of users, the user shortlist based on a determination of relevance of messages from the author to users on the shortlist; scoring the message for each user of the set of users with a classifier model that takes a vector representation of a content of the message and the vector representations of the user, the author of the message, and the message channel associated with the message as input; and determining based on the scoring, as a subset of the set of users, the one or more of the plurality of users to whom the message is to be recommended.

31. The recommendation system of example 30, wherein the operations further comprise at least one of adding one or more users to the subset or removing one or more users from the subset based on user feedback received on previous message recommendations.

32. The recommendation system of example 30 or example 31, wherein the bipartite graphs include one or more bipartite graphs representing relationships between users, one or more bipartite graphs representing relationships between users and authors, and one or more bipartite graphs representing relationships between users and channels.

33. The recommendation system of any of examples claim 30-32, wherein the vector representations of the plurality of users, the plurality of authors, and the plurality of message channels are computed with graph-based convolutional neural networks for the bipartite graphs.

34. The recommendation system of any of examples 30-33, wherein the graph-based convolutional neural networks and a classifier neural network of the classifier model have been trained end-to-end based on training data comprising pairs of a user and a message along with indications whether the message is relevant to the user.

35. The recommendation system of example 34, wherein the graph-based convolutional neural networks and classifier neural network have been trained to optimize a recommendation-performance metric that, for each user, rewards occurrence of a relevant message in a specified number of top-scoring messages for the user and penalizes occurrence of an irrelevant message in the specified number of top-scoring messages for the user.

36. The recommendation system of any of examples 30-35, wherein the classifier model is a classifier neural network taking a concatenation of the embedding of the content of the message and the vector representations of the user, the author of the message, and the message channel associated with the message as input.

37. The recommendation system of any of examples 30-36, wherein the one or more users to whom the message is to be recommended are identified in real-time upon posting of the message to the associated message channel.

38. One or more computer-readable media for determining, within a message system in which messages are each assigned to one or more of a plurality of message channels and a plurality of users each have access to one or more of the plurality of message channels, recommendations of messages to users, the one or more computer-readable media storing: vector representations of the plurality of users, a plurality of authors, and the plurality of message channels, the vector representations computed based on bipartite graphs each representing a relationship between a combination of the users, authors, and message channels; and processor-executable instructions which, when executed by one or more computer processors, cause the one or more computer processors to perform operations for identifying, for each of a plurality of messages, one or more of the plurality of users to whom the message is to be recommended, the operations comprising: filtering, among the plurality of users, users having access to a message channel to which the message is assigned based on a user shortlist associated with an author of the message to determine a set of users, the user shortlist based on a determination of relevance of messages from the author to users on the shortlist; scoring the message for each user of the set of users with a classifier model that takes a vector representation of a content of the message and the vector representations of the user, the author of the message, and the message channel associated with the message as input; and determining based on the scoring, as a subset of the set of users, the one or more of the plurality of users to whom the message is to be recommended.

39. The one or more computer-readable media of example 38, wherein the operations further comprise at least one of adding one or more users to the subset or removing one or more users from the subset based on user feedback received on previous message recommendations.

40. The one or more computer-readable media of example 38 or example 39, wherein the bipartite graphs include one or more bipartite graphs representing relationships between users, one or more bipartite graphs representing relationships between users and authors, and one or more bipartite graphs representing relationships between users and channels.

41. The one or more computer-readable media of any of examples 38-40, wherein the vector representations of the plurality of users, the plurality of authors, and the plurality of message channels are computed with graph-based convolutional neural networks for the bipartite graphs.

42. A recommendation system for determining, within a message system in which messages are each assigned to one or more of a plurality of message channels and a plurality of users each have access to one or more of the plurality of message channels, recommendations of messages to users, the system comprising: means for storing vector representations of the plurality of users, a plurality of authors, and the plurality of message channels, the vector representations computed based on bipartite graphs each representing a relationship between a combination of the users, authors, and message channels; means for identifying, for each of a plurality of messages, one or more of the plurality of users to whom the message is to be recommended, comprising means for filtering, among the plurality of users, users having access to a message channel to which the message is assigned based on a user shortlist associated with an author of the message to determine a set of users, the user shortlist based on a determination of relevance of messages from the author to users on the shortlist; means for scoring the message for each user of the set of users with a classifier model that takes a vector representation of a content of the message and the vector representations of the user, the author of the message, and the message channel associated with the message as input; and means for determining based on the scoring, as a subset of the set of users, the one or more of the plurality of users to whom the message is to be recommended.

Although embodiments have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A method for determining, within a message system in which messages are each assigned to one or more of a plurality of message channels and a plurality of users each have access to one or more of the plurality of message channels, recommendations of messages to users, the method comprising:

storing, in computer memory, vector representations of the plurality of users, a plurality of authors, and the plurality of message channels, the vector representations computed based on bipartite graphs each representing a relationship between a combination of the users, authors, and message channels; and using a computer processor to identify, for each of a plurality of messages, one or more of the plurality of users to whom the message is to be recommended, by:

filtering, among the plurality of users, users having access to a message channel to which the message is assigned based on a user shortlist associated with an author of the message to determine a set of users, the user shortlist based on a determination of relevance of messages from the author to users on the shortlist;

scoring the message for each user of the set of users with a classifier model that takes a vector representation of a content of the message and the vector representations of the user, the author of the message, and the message channel associated with the message as input; and determining based on the scoring, as a subset of the set of users, the one or more of the plurality of users to whom the message is to be recommended.

2. The method of claim 1, wherein identifying the one or more users to whom the message is to be recommended further comprises at least one of adding one or more users to the subset or removing one or more users from the subset based on user feedback received on previous message recommendations.

3. The method of claim 1, wherein the bipartite graphs include one or more bipartite graphs representing relationships between users, one or more bipartite graphs representing relationships between users and authors, and one or more bipartite graphs representing relationships between users and channels.

4. The method of claim 1, wherein the vector representations of the plurality of users, the plurality of authors, and the plurality of message channels are computed with graph-based convolutional neural networks for the bipartite graphs.

5. The method of claim 1, wherein the graph-based convolutional neural networks and a classifier neural network of the classifier model have been trained end-to-end based on training data comprising pairs of a user and a message along with indications whether the message is relevant to the user.

6. The method of claim 5, wherein the graph-based convolutional neural networks and classifier neural network have been trained to optimize a recommendation-performance metric that, for each user, rewards occurrence of a relevant message in a specified number of top-scoring messages for the user and penalizes occurrence of an irrelevant message in the specified number of top-scoring messages for the user.

7. The method of claim 1, wherein the classifier model is a classifier neural network taking a concatenation of the vector representation of the content of the message and the vector representations of the user, the author of the message, and the message channel associated with the message as input.

8. The method of claim 1, wherein the one or more users to whom the message is to be recommended are identified in real-time upon posting of the message to the associated message channel.

9. A recommendation system for determining, within a message system in which messages are each assigned to one or more of a plurality of message channels and a plurality of users each have access to one or more of the plurality of message channels, recommendations of messages to users, the system comprising:
    computer memory storing vector representations of the plurality of users, a plurality of authors, and the plurality of message channels, the vector representations computed based on bipartite graphs each representing a relationship between a combination of the users, authors, and message channels; and
    a computer processor executing instructions stored in the computer memory to perform operations for identifying, for each of a plurality of messages, one or more of the plurality of users to whom the message is to be recommended, the operations comprising:
        filtering, among the plurality of users, users having access to a message channel to which the message is assigned based on a user shortlist associated with an author of the message to determine a set of users, the user shortlist based on a determination of relevance of messages from the author to users on the shortlist;
        scoring the message for each user of the set of users with a classifier model that takes a vector representation of a content of the message and the vector representations of the user, the author of the message, and the message channel associated with the message as input; and
        determining based on the scoring, as a subset of the set of users, the one or more of the plurality of users to whom the message is to be recommended.

10. The recommendation system of claim 9, wherein the operations further comprise at least one of adding one or more users to the subset or removing one or more users from the subset based on user feedback received on previous message recommendations.

11. The recommendation system of claim 9, wherein the bipartite graphs include one or more bipartite graphs representing relationships between users, one or more bipartite graphs representing relationships between users and authors, and one or more bipartite graphs representing relationships between users and channels.

12. The recommendation system of claim 9, wherein the vector representations of the plurality of users, the plurality of authors, and the plurality of message channels are computed with graph-based convolutional neural networks for the bipartite graphs.

13. The recommendation system of claim 9, wherein the graph-based convolutional neural networks and a classifier neural network of the classifier model have been trained end-to-end based on training data comprising pairs of a user and a message along with indications whether the message is relevant to the user.

14. The recommendation system of claim 13, wherein the graph-based convolutional neural networks and classifier neural network have been trained to optimize a recommendation-performance metric that, for each user, rewards occurrence of a relevant message in a specified number of top-scoring messages for the user and penalizes occurrence of an irrelevant message in the specified number of top-scoring messages for the user.

15. The recommendation system of claim 9, wherein the classifier model is a classifier neural network taking a concatenation of the vector representation of the content of the message and the vector representations of the user, the author of the message, and the message channel associated with the message as input.

16. The recommendation system of claim 9, wherein the one or more users to whom the message is to be recommended are identified in real-time upon posting of the message to the associated message channel.

17. One or more non-transitory computer-readable media for determining, within a message system in which messages are each assigned to one or more of a plurality of message channels and a plurality of users each have access to one or more of the plurality of message channels, recommendations of messages to users, the one or more computer-readable media storing:
    vector representations of the plurality of users, a plurality of authors, and the plurality of message channels, the vector representations computed based on bipartite graphs each representing a relationship between a combination of the users, authors, and message channels; and
    processor-executable instructions which, when executed by one or more computer processors, cause the one or more computer processors to perform operations for identifying, for each of a plurality of messages, one or more of the plurality of users to whom the message is to be recommended, the operations comprising:
        filtering, among the plurality of users, users having access to a message channel to which the message is assigned based on a user shortlist associated with an author of the message to determine a set of users, the user shortlist based on a determination of relevance of messages from the author to users on the shortlist;
        scoring the message for each user of the set of users with a classifier model that takes a vector representation of a content of the message and the vector representations of the user, the author of the message, and the message channel associated with the message as input; and determining based on the scoring, as a subset of the set of users, the one or more of the plurality of users to whom the message is to be recommended.

18. The one or more computer-readable media of claim 17, wherein the operations further comprise at least one of adding one or more users to the subset or removing one or more users from the subset based on user feedback received on previous message recommendations.

19. The one or more computer-readable media of claim 17, wherein the bipartite graphs include one or more bipartite graphs representing relationships between users, one or more bipartite graphs representing relationships between users and authors, and one or more bipartite graphs representing relationships between users and channels.

20. The one or more computer-readable media of claim 17, wherein the vector representations of the plurality of users, the plurality of authors, and the plurality of message channels are computed with graph-based convolutional neural networks for the bipartite graphs.

* * * * *